United States Patent
Zhang

(10) Patent No.: US 12,517,986 B2
(45) Date of Patent: Jan. 6, 2026

(54) AUTHORIZATION VERIFICATION SYSTEM, METHOD AND APPARATUS FOR APPLICATION, AND STORAGE MEDIUM

(71) Applicant: Hangzhou Hikvision Digital Technology Co., Ltd., Hangzhou (CN)

(72) Inventor: Xiaoqi Zhang, Hangzhou (CN)

(73) Assignee: HANGZHOU HIKVISION DIGITAL TECHNOLOGY CO., LTD., Hangzhou (CN)

(*) Notice: Subject to any disclaimer, the term of this patent is extended or adjusted under 35 U.S.C. 154(b) by 566 days.

(21) Appl. No.: 17/904,261

(22) PCT Filed: Feb. 7, 2021

(86) PCT No.: PCT/CN2021/075811
§ 371 (c)(1),
(2) Date: Aug. 15, 2022

(87) PCT Pub. No.: WO2021/164598
PCT Pub. Date: Aug. 26, 2021

(65) Prior Publication Data
US 2023/0092264 A1 Mar. 23, 2023

(30) Foreign Application Priority Data
Feb. 17, 2020 (CN) .......................... 202010095668.4

(51) Int. Cl.
*G06F 21/12* (2013.01)
*G06F 21/10* (2013.01)

(52) U.S. Cl.
CPC .......... *G06F 21/121* (2013.01); *G06F 21/107* (2023.08)

(58) Field of Classification Search
None
See application file for complete search history.

(56) References Cited

U.S. PATENT DOCUMENTS

| 5,260,999 A | 11/1993 | Wyman | |
|---|---|---|---|
| 2011/0179268 A1* | 7/2011 | Strom | H04L 9/3247 713/168 |

(Continued)

FOREIGN PATENT DOCUMENTS

| CN | 1621992 | 6/2005 |
|---|---|---|
| CN | 101741562 | 6/2010 |

(Continued)

OTHER PUBLICATIONS

Huang, J.-Y., et al., "A Software Licensing Authorization Scheme Based on Hardware Component Identifiers", 2014 International Conference on Information Science, Electronics and Electrical Engineering (vol. 3, 2014, pp. 1673-1676) (Year: 2014).*

(Continued)

*Primary Examiner* — Clay C Lee
(74) *Attorney, Agent, or Firm* — NORTON ROSE FULBRIGHT US LLP

(57) ABSTRACT

An authorization verification system, method, and apparatus for an application and storage medium is disclosed. A license key information corresponding to the application is generated according to description information of the application and information of the admission device, and before importing the application into the target device, the license key information corresponding to the application is used to perform authorization verification. It is determined whether to import the software package of the application into the target device based on a result of the authorization verification; after importing the software package of the application into the target device, secondary authorization verification is performed again on the target device according to the software package of the application, and it is determined whether to allow the target device to run the software (Continued)

package of the application based on a result of the secondary authorization verification.

12 Claims, 8 Drawing Sheets

(56) References Cited

U.S. PATENT DOCUMENTS

| | | | | |
|---|---|---|---|---|
| 2012/0023596 | A1* | 1/2012 | Womack | G06F 21/105 |
| | | | | 726/29 |
| 2014/0026196 | A1 | 1/2014 | Hayat | |
| 2014/0283092 | A1* | 9/2014 | Mowatt | G06F 21/105 |
| | | | | 726/26 |
| 2014/0325683 | A1 | 10/2014 | Dwivedi et al. | |
| 2018/0260538 | A1* | 9/2018 | Peza Ramirez | G06F 21/105 |
| 2019/0147145 | A1* | 5/2019 | Matsudaira | G06F 21/105 |
| | | | | 726/27 |

FOREIGN PATENT DOCUMENTS

| | | | |
|---|---|---|---|
| CN | 102024127 | 4/2011 | |
| CN | 102075933 | 5/2011 | |
| CN | 102271130 | 12/2011 | |
| CN | 102487399 | 6/2012 | |
| CN | 104468598 | 3/2015 | |
| CN | 105491062 | 4/2016 | |
| WO | WO-2017095256 A1 * | 6/2017 | ............ G06F 21/64 |

OTHER PUBLICATIONS

"Training materials for large gas-steam combined cycle power plants", *Diasys/Ovation*, Control Volume Part 2, 2014.

Extended European Search Report issued in corresponding European Application No. 21757932.5, dated Jul. 4, 2023.

Office Action issued in corresponding Chinese Application No. 202010095668.4, dated Apr. 28, 2023.

International Search Report and Written Opinion issued in Corresponding PCT Application No. PCT/CN2021/075811, dated Mar. 31, 2021 (English Translation provided).

* cited by examiner

AUTHORIZATION VERIFICATION SYSTEM, METHOD AND APPARATUS FOR APPLICATION, AND STORAGE MEDIUM

CROSS REFERENCE TO RELATED APPLICATIONS

The present application is a national phase application under 35 U.S.C. § 371 of International Application No. PCT/CN2021/075811, filed Feb. 7, 2021, which claims the benefit of priority to Chinese patent application No. 202010095668.4 filed with the China National Intellectual Property Administration on Feb. 17, 2020 and entitled "AUTHORIZATION VERIFICATION SYSTEM, METHOD, APPARATUS FOR APPLICATION, AND STORAGE MEDIUM", each of which are incorporated herein by reference in their entirety.

TECHNICAL FIELD

The present application relates to the field of communication technology, and in particular, to an authorization verification system, method, apparatus for an application and storage medium.

BACKGROUND

Current applications (such as algorithm models, software, etc.) usually do not have authorization functions, and users can use them in any computer device after creating the applications. Therefore, as long as other users can obtain an application package, and import the application package to a computer device, the computer device can run the application. However, some users have higher requirements for the security of applications, and hope that applications such as algorithm models and software created by themselves can only run in designated computer devices, and other computer devices cannot use these applications casually. For long term consideration, it is necessary to add authorization functions to these applications to avoid collusion and abuse of the applications.

SUMMARY

The purposes of the embodiments of the present application are to provide an authorization verification system, method, apparatus for an application and storage medium, so as to improve the security of the application. Specifically, the technical solutions are as follows.

In a first aspect, an embodiment of the present application provides an authorization verification system for an application, wherein the application is a combination of one or more of an algorithm model and a software; the authorization verification system includes: an authorization platform, a device as an admission device and/or a target device of the application;

the authorization platform is configured for obtaining description information of the application and information of the admission device; generating license key information corresponding to the application according to the description information and the information of the admission device;

the authorization platform is further configured for obtaining information of the target device of the application; performing authorization verification on the target device according to the license key information, if the authorization verification is passed, importing a software package of the application into the target device, if the authorization verification is not passed, prohibiting the software package of the application from being imported into the target device;

the target device is configured for receiving the software package of the application imported by the authorization platform; performing secondary authorization verification for the target device according to the software package of the application; determining whether to allow the target device to run the software package of the application based on a result of the secondary authorization verification.

In a second aspect, an embodiment of the present application provides an authorization verification method for an application, wherein the application is a combination of one or more of an algorithm model and a software; the method is applied to an authorization platform, including:

obtaining description information and information of an admission device of the application; generating license key information corresponding to the application according to the description information and the information of the admission device;

obtaining information of a target device of the application;

performing authorization verification on the target device according to the license key information;

importing, if the authorization verification is passed, a software package of the application into the target device, so that the target device performs secondary authorization verification for the target device according to the software package of the application, and determines whether to allow the target device to run the software package of the application based on a result of the secondary authorization verification;

prohibiting, if the authorization verification for the target device is not passed, the software package of the application from being imported into the target device.

In a third aspect, an embodiment of the present application provides an authorization verification method for an application, wherein the application is a combination of one or more of an algorithm model and a software; the method is applied to a target device of the application, including:

receiving a software package of the application imported by an authorization platform after authorization verification for the target device is passed according to license key information corresponding to the application;

performing secondary authorization verification on the target device according to the software package of the application, and determining whether to allow the target device to run the software package of the application based on a result of the secondary authorization verification.

In a fourth aspect, an embodiment of the present application provides a schematic structural diagram of an authorization verification apparatus for an application, wherein the application is a combination of one or more of an algorithm model and a software; the apparatus is applied to an authorization platform, including:

a generation module, configured for obtaining description information of the application and information of an admission device; generating license key information corresponding to the application according to the description information and the information of the admission device;

an obtaining module, configured for obtaining information of a target device of the application;

a verification module, configured for performing authorization verification on the target device according to the license key information;

a sending module, configured for importing a software package of the application into the target device if the authorization verification for the target device is passed, so that the target device performs secondary authorization verification on the target device according to the software package of the application, and determining whether to allow the target device to run the software package of the application based on a result of the secondary authorization verification;

a prohibiting module, configured for prohibiting the software package of the application from being imported into the target device if the authorization verification for the target device is not passed.

In a fifth aspect, an embodiment of the present application provides a schematic structural diagram of an authorization verification apparatus for an application, wherein the application is a combination of one or more of an algorithm model and a software; the apparatus is applied to a target device of the application, including:

a receiving module, configured for receiving a software package of the application imported by an authorization platform after the authorization verification for the target device is passed according to license key information corresponding to the application;

a verification module, configured for performing secondary authorization verification on the target device according to the software package of the application, and determining whether to allow the target device to run the software package of the application based on a result of the secondary authorization verification.

In a sixth aspect, an embodiment of the present application provides an authorization verification apparatus for an application, wherein the application is a combination of one or more of an algorithm model and a software; the apparatus is applied to an authorization platform, including: a processor, and a non-transitory computer readable storage medium connected with the processor through a bus;

one or more computer programs is stored in the non-transitory computer readable storage medium, which, when executed by the processor, the processor implements the following steps:

obtaining description information and information of the admission device of an application; generating license key information corresponding to the application according to the description information and the information of the admission device;

obtaining information of a target device of the application;

performing authorization verification on the target device according to the license key information;

importing, if the authorization verification for the target device is passed, a software package of the application into the target device, so that the target device performs secondary authorization verification on the target device according to the software package of the application, and determining whether to allow the target device to run the software package of the application based on a result of the secondary authorization verification;

prohibiting the software package of the application from being imported into the target device if the authorization verification for the target device is not passed.

In a seventh aspect, an embodiment of the present application provides an authorization verification apparatus for an application, wherein the application is a combination of one or more of an algorithm model and a software; the apparatus is applied to a target device of the application, including: a processor, and a non-transitory computer readable storage medium connected with the processor through a bus;

one or more computer programs is stored in the non-transitory computer readable storage medium, which, when executed by the processor, the processor implements the following steps:

receiving a software package of the application imported by an authorization platform after the authorization verification for the target device is passed according to license key information corresponding to the application;

performing secondary authorization verification on the target device according to the software package of the application, and determining whether to allow the target device to run the software package of the application based on a result of the secondary authorization verification.

In an eighth aspect, an embodiment of the present application provides a non-transitory computer readable storage medium, wherein instructions are stored in the non-transitory computer readable storage medium, which, when executed by a processor, cause the processor to implement steps of any one of the above-mentioned two authorization verification methods for application.

In a ninth aspect, an embodiment of the present application provides a computer program product, which, when executed, performs steps of any one of the above-mentioned two authorization verification methods for application.

As can be seen from the above technical solutions, in this application, license key information corresponding to the application is generated according to the description information of the application and the information of the admission device, and before importing the application into the target device, the license key information corresponding to the application is used to perform authorization verification, it is determined whether to import the software package of the application into the target device based on a result of the authorization verification; after importing the software package of the application into the target device, secondary authorization verification is performed again on the target device according to the software package of the application, and it is determined whether to allow the target device to run the software package of the application based on a result of the secondary authorization verification. It can be seen that the present application ensures that the application can only be run in the admission device through two authorization verifications online and offline, which can effectively improve the security of the application.

BRIEF DESCRIPTION OF THE DRAWINGS

In order to more clearly describe the technical solution of the embodiments of the application and the prior art, drawings needed in the embodiments and the prior art will be briefly described below. Obviously, the drawings described below are for only some embodiments of the present application, one of ordinary skills in the art can also obtain other drawings based on these drawings without any creative efforts.

DETAILED DESCRIPTION

In order to make objectives, technical solutions and advantages of the present application more apparent, the present application now will be described in detail with reference to the accompanying drawings and the detailed description. Obviously, the embodiments described are only some of the embodiments of the present application instead of all the embodiments. All further embodiments obtained by those of ordinary skills in the art based on the embodiments herein without any creative efforts are within the scope of the present application.

In the embodiments of the present application, two authorization verifications combining online and offline are used for the application, wherein, before importing the application into the target device, authorization verification is performed on the target device in an online manner; after importing the application into the target device, the target device is subject to secondary authorization verification in an offline manner, the target device is allowed to use the application only after both authorization verifications are passed, so as to effectively ensure the security of the application.

In the embodiments of the present application, an application refers to one of an algorithm model and a software, or a combination of one or more of an algorithm model and a software. Wherein, the software can be executed, and data of the software includes one file or one group of files related to the execution of the software.

Figure 1:
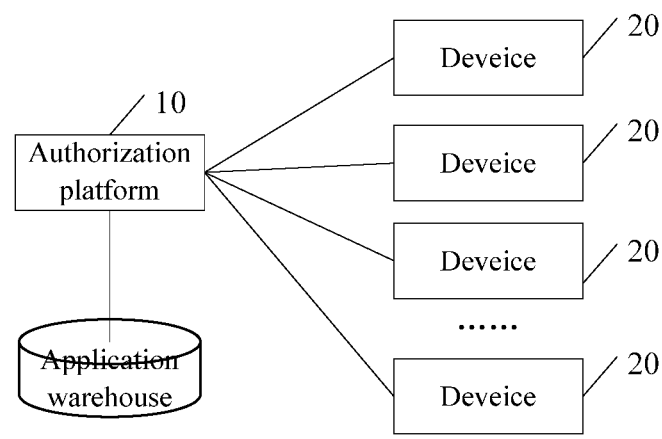
FIG. 1 is a schematic diagram of the architecture of an authorization verification system applied in embodiment 1 of the present application.

The application is described in detail below in conjunction with specific embodiments:

Referring to FIG. 1, which is a schematic diagram of the architecture of an authorization verification system applied in embodiment 1 of the present application. As shown in FIG. 1, the system includes an authorization platform 10 and a device 20. Generally, when it is not determined whether the application provider allows the device 20 to use the application, the device 20 can be referred to as a target device 20b of the application, and when it is determined that the application provider allows the device 20 to use the application, the device 20 can be called an admission device 20a of the application.

In the embodiment, the authorization platform 10 is configured for obtaining description information and information of the admission device 20a of an application; generating license key information (LicenseKey) corresponding to the application according to the description information and the information of the admission device 20a.

The admission device 20a of the application refers to a device that the application provider allows to use the application. Devices other than the admission device 20a are not allowed to use the application, and non-admission devices can be filtered/excluded through authorization verification on the authorization platform 10 and secondary authorization verification on the target device 20b.

In addition, the description information of the application can be pre-generated and stored in the specified storage location together with the application. Therefore, in this embodiment, the authorization platform 10 can also obtain data and description information of the application from a specified storage location to facilitate subsequent authorization verification.

In this embodiment, the authorization platform 10 is further configured for obtaining information of the target device 20b of the application; performing, based on the information of the target device 20b, authorization verification on the target device 20b according to the generated license key information; if the authorization verification is passed, importing the software package of the application into the target device 20b; otherwise, prohibiting the software package of the application from being imported into the target device 20b.

Correspondingly, the target device 20b is configured for receiving the software package of the application imported by the authorization platform 10, performing secondary authorization verification on the target device 20b according to the software package of the application, and determining whether to allow the target device 20b to run the software package of the application based on a result of the secondary authorization verification. Specifically, if the secondary authorization verification for the target device 20b is passed, the target device 20b is allowed to run the software package of the application; if the secondary authorization verification for the target device 20b is not passed, the target device 20b is prohibited from running the software package of the application.

The target device 20b of the application refers to a device that the user of the application wishes to use the application, and the target device 20b may or may not be an admission device of the application. If the target device 20b is an admission device of the application, it can pass the authorization verification on the authorization platform 10 and the secondary authorization verification on the target device 20b; if the target device 20b is not the admission device of the application, it cannot pass the authorization verification on the authorization platform 10 and/or the secondary authorization verification on the target device 20b.

It can be seen from the system shown in FIG. 1 that in the present application, the authorization verification is performed on the authorization platform for the target device in an online manner, and the secondary authorization verification is performed on the target device of the application in an offline manner. The combination of online verification and offline verification performs two authorization verifications on the target device of the application, which can effectively improve the security of the application.

The embodiment of the present application also provides a second authorization verification system. The system architecture of the authorization verification system is similar to the system architecture shown in FIG. 1, that is, the system also includes: an authorization platform 10 and a device 20.

In the embodiment, the authorization platform 10 is configured for obtaining description information and information of the admission device 20a of an application; generating license key information (LicenseKey) corresponding to the application according to the description information and the information of the admission device 20a;

The admission device 20a of the application refers to a device that the application provider allows to use the application. Devices other than the admission device 20a are not allowed to use the application, and non-admission devices can be filtered/excluded through authorization verification on the authorization platform 10 and secondary authorization verification on the target device 20b.

In addition, the description information of the application can be pre-generated and stored in the specified storage location together with the application. Therefore, in this embodiment, the authorization platform 10 can also obtain data and description information of the application from a specified storage location to facilitate subsequent authorization verification.

In this embodiment, the description information of the application may include an application identifier (AppID). The information of the admission device may include a device identifier (DeviceID). The license key information may include: an application identifier (AppID), an admission device identifier (DeviceID), and authorization verification information (LicenseKey).

The authorization platform 10 can specifically be configured for taking the application identifier in the description information and the device identifier of the admission device 20a as the application identifier and the admission device identifier in the license key information respectively; generating first information based on data of the application and the description information, and taking the first information as the authorization verification information of the license key information.

Here, the specific method of generating first information based on data of the application and the description information may be: encrypting the data and description information of the application or converting them based on a certain rule, and taking an encryption result or conversion result as the first information, wherein the certain rule may be a self-defined rule, wherein the rule for converting the data and description information of the application can play an encryption effect, which is not specifically limited in this application.

In this embodiment, the authorization platform 10 is further configured for obtaining information of the target device 20b of the application; performing, based on the information of the target device 20b, authorization verification on the target device 20b according to the generated license key information; if the authorization verification is passed, importing the software package of the application into the target device 20b; otherwise, prohibiting the software package of the application from being imported into the target device 20b.

Correspondingly, the target device 20b is configured for receiving the software package of the application imported by the authorization platform 10, performing secondary authorization verification on the target device 20b according to the software package of the application, and determining whether to allow the target device 20b to run the software package of the application based on a result of the secondary authorization verification. Specifically, if the secondary authorization verification for the target device 20b is passed, the target device 20b is allowed to run the software package of the application; if the secondary authorization verification for the target device 20b is not passed, the target device 20b is prohibited from running the software package of the application.

The target device 20b of the application refers to a device that the user of the application wishes to use the application, and the target device 20b may or may not be an admission device of the application. If the target device 20b is an admission device of the application, it can pass the authorization verification on the authorization platform 10 and the secondary authorization verification on the target device 20b; if the target device 20b is not the admission device of the application, it cannot pass the authorization verification on the authorization platform 10 and/or the secondary authorization verification on the target device 20b.

It can be seen from the system provided by this embodiment that in this application, the application identifier, the admission device identifier, and the authorization verification information are used as license key information, thereby providing multiple security guarantees for the security of the application. And in the present application, the authorization verification is performed on the authorization platform for the target device in an online manner, and the secondary authorization verification is performed on the target device of the application in an offline manner. The combination of online verification and offline verification performs two authorization verifications on the target device of the application, which can effectively improve the security of the application.

Figure 2:
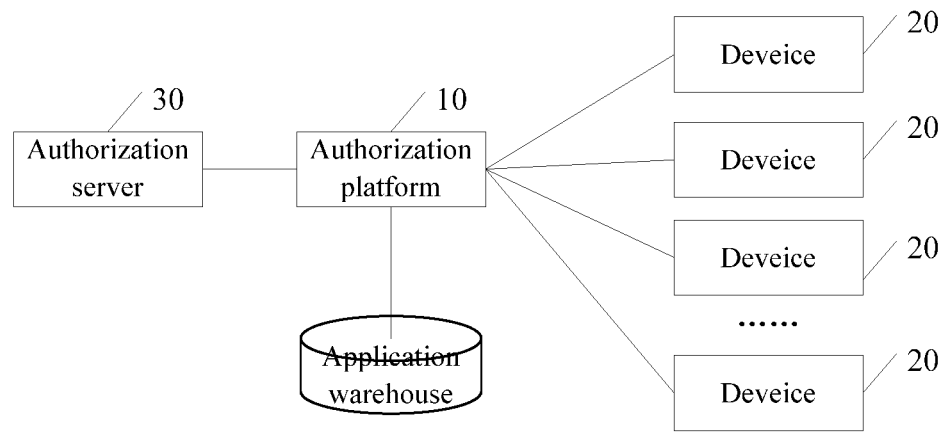
FIG. 2 is a schematic diagram of the architecture of an authorization verification system applied in embodiment 2 of the present application.

Referring to FIG. 2, FIG. 2 is a schematic diagram of the architecture of an authorization verification system applied in embodiment 2 of the present application, and FIG. 2 is an extension architecture of the system architecture shown in FIG. 1. As shown in FIG. 2, the system includes an authorization platform 10, a device 20 and an authorization server 30.

In this embodiment, the authorization platform 10, the admission device 20a and the target device 20b all have the same functions and roles as in the system shown in FIG. 1. In addition, the authorization platform 10 and the authorization server 30 cooperate to realize the generation of the license key information.

The authorization platform 10 can specifically be configured for sending a license generation instruction to the authorization server 30, wherein the license generation instruction carries description information and information of the admission device; receiving license key information corresponding to the application returned by the authorization server 30.

Correspondingly, the authorization server 30 is configured for receiving the license generation instruction sent by the authorization platform 10; reading the description information and the information of the admission device 20a from the license generation instruction; generating the license key information corresponding to the application according to the description information and the information of the admission device 20a, and returning the generated license key information to the authorization platform 10.

In this embodiment, the description information of the application includes an application identifier (AppID). The information of the admission device includes a device identifier (DeviceID). The license key information includes:

an application identifier (AppID), an admission device identifier (DeviceID), and authorization verification information (LicenseKey).

The authorization server 30 is specifically be configured for taking the application identifier in the description information and the device identifier of the admission device 20a as the application identifier and the admission device identifier in the license key information respectively; generating first information based on data of the application and the description information, and taking the first information as the authorization verification information of the license key information.

Here, the specific method of generating first information based on data of the application and the description information may be: encrypting the data and description information of the application or converting them based on a certain rule, and taking an encryption result or conversion result as the first information, wherein the certain rule may be a self-defined rule, wherein the rule for converting the data and description information of the application can play an encryption effect, which is not specifically limited in this application.

It can be seen that, in this embodiment, the function of generating license key information is separated from the authorization platform 10, and the function of generating license key information is realized by the authorization server 30, which can reduce the processing pressure of the authorization platform 10.

In this embodiment, the description information of the application further includes an authorization mark (authorized). The authorization mark has two values, one is an allowable authorization mark value, and the other is a prohibited authorization mark value, which can be set by the application provider. When the authorization mark value in the description information of the application is the allowable authorization mark value (for example, true), it indicates that the application provider allows some devices to be authorized to use the application; when the authorization mark value in the description information of the application is the prohibited authorization mark value (for example, false), it indicates that the application provider does not authorize the application, the application is public and any device is allowed to use the application. Therefore, only when the authorization mark in the description information of the application is true, the authorization verification on the authorization platform 10 and the secondary authorization verification on the target device 20b will be performed. When the authorization mark is false, the existing method can be used.

Therefore, the authorization platform 10 can specifically be configured for, if a value of the authorization mark is the allowable authorization mark value, the application identifier in the description information is the same as the application identifier in the license key information, and the device identifier of the target device 20b is one device identifier in the license key information, determining that the authorization verification for the target device 20 is passed; otherwise, determining that the authorization verification for the target device 20b is not passed.

In practical applications, when authorizing a device to use an application, the authorization time limit cannot be set, that is, the application can be used all the time after authorization; the authorization time limit can also be set, that is, the application is only authorized to be used within a limited time, and after the authorization time limit expires, if you want to continue to use the application, you need to submit the application to the authorization platform 10 again as an admission device of the application, so that the authorization platform 10 regenerates the license key information.

Therefore, in this embodiment, the license key information may further include: an effective time and authorization time limit.

The authorization server 30 is further configured for setting the effective time in the license key information as current time; and setting the authorization time limit in the license key information as a preset time limit.

Correspondingly, when the authorization platform 10 performs authorization verification on the target device 20b, it is also necessary to determine whether the authorization time limit has been reached.

Specifically, the authorization platform 10 can specifically be configured for calculating a time difference between current time and effective time in the license key information; comparing the time difference with the authorization time limit in the license key information; when the time difference is not less than the authorization time limit, determining that the authorization verification for the target device 20b is not passed; when the time difference is less than the authorization time limit, if a value of the authorization mark is the allowable authorization mark value, the application identifier in the description information is the same as the application identifier in the license key information, and the device identifier of the target device 20b is one device identifier in the license key information, determining that the authorization verification for the target device 20b is passed; otherwise, determining that the authorization verification for the target device 20b is not passed.

In this embodiment, the target device 20b uses the software package and license key information of the application to perform secondary authorization verification on the target device 20b.

In an optional embodiment of the present application, the authorization platform 10 is further configured for importing the license key information into the admission device 20a.

For the case that the license key information is imported into the admission device 20a after the authorization platform 10 generates the license key information, the implementation of the target device 20b performs the secondary authorization verification on the target device 20b according to the software package of the application can be divided into the following two types depending on whether the authorization time limit is included in the license key.

First, the license key information does not include an effective time and authorization time limit.

In this case, the target device 20b can specifically be configured for determining whether the license key information has been imported into the target device 20b when the software package of the application is run for the first time; if the license key information has been imported, unpacking the software package of the application to obtain data and description information of the application; generating first information based on the data and description information of the application, comparing the first information with the authorization verification information in the license key information; if the first information is the same as the authorization verification information in the license key information, determining that the secondary authorization verification for the target device 20b is passed; otherwise, determining that the secondary authorization verification for the target device 20b is not passed; if the license key information is not imported, determining that the secondary authorization verification for the target device 20b is not passed.

Second, the license key information also includes an effective time and authorization time limit.

In this case, the target device 20b can specifically be configured for calculating a first time difference between the current time and the effective time in the license key information when the software package of the application is run for the first time, and comparing the first time difference with the authorization time limit in the license key information; if the first time difference is not less than the authorization time limit, determining that the secondary authorization verification for the target device 20b is not passed; if the first time difference is less than the authorization time limit, determining whether the license key information has been imported into the target device 20b; if the license key information has been imported, unpacking the software package of the application to obtain data and description information of the application; generating first information based on the data and description information of the application, comparing the first information with the authorization verification information in the license key information; if the first information is the same as the authorization verification information in the license key information, determining that the secondary authorization verification for the target device 20b is passed; otherwise, determining that the secondary authorization verification for the target device 20b is not passed; if the license key information is not imported, determining that the secondary authorization verification for the target device 20b is not passed.

In addition, since the license key information has authorization time limit, each time the target device 20b runs the software package of the application, it needs to first determine whether the software package of the application has reached the authorization time limit.

Therefore, the target device 20b can also be configured for calculating a second time difference between the current time and the effective time in the license key information when the software package of the application is run again, and comparing the second time difference with the authorization time limit in the license key information; if the second time difference is not less than the authorization time limit, prohibiting the target device 20b from running the software package of the application again; if the second time difference is less than the authorization time limit, allowing the target device 20b to run the software package of the application again.

In another optional embodiment of the present application, the authorization platform 10 is further configured for importing the license key information into the target device 20b.

For the case that the license key information is further imported into the admission device 20b when the authorization platform 10 imports the software package of the application into the target device 20b, the implementation of the target device 20b performs the secondary authorization verification on the target device 20b according to the software package of the application can be divided into the following two types depending on whether the authorization time limit is included in the license key.

First, the license key information does not include effective time and authorization time limit.

In this case, the target device 20b can specifically be configured for unpacking, when the software package of the application is run for the first time, the software package of the application to obtain data and description information of the application; generating first information based on the data and description information of the application, comparing the first information with the authorization verification information in the license key information; if the first information is the same as the authorization verification information in the license key information, determining that the secondary authorization verification for the target device 20b is passed; otherwise, determining that the secondary authorization verification for the target device 20b is not passed.

Second, the license key information also includes an effective time and authorization time limit.

In this case, the target device 20b can specifically be configured for calculating a first time difference between the current time and the effective time in the license key information when the software package of the application is run for the first time, and comparing the first time difference with the authorization time limit in the license key information; if the first time difference is not less than the authorization time limit, determining that the secondary authorization verification for the target device 20b is not passed; if the first time difference is less than the authorization time limit, unpacking the software package of the application to obtain data and description information of the application; generating first information based on the data and description information of the application, comparing the first information with the authorization verification information in the license key information; if the first information is the same as the authorization verification information in the license key information, determining that the secondary authorization verification for the target device 20b is passed; otherwise, determining that the secondary authorization verification for the target device 20b is not passed.

In addition, since the license key information has authorization time limit, each time the target device 20b runs the software package of the application, it needs to determine whether the software package of the application has reached the authorization time limit.

Therefore, the target device 20b can also be configured for calculating a second time difference between the current time and the effective time in the license key information when the software package of the application is run again, and comparing the second time difference with the authorization time limit in the license key information; if the second time difference is not less than the authorization time limit, prohibiting the target device 20b from running the software package of the application again; if the second time difference is less than the authorization time limit, allowing the target device 20b to run the software package of the application again.

It can be seen from the system shown in FIG. 2 that the present application performs two authorization verifications on the target device of the application through a combination of online verification and offline verification, which can effectively improve the security of the application. In addition, the present application also uses an authorization server to undertake the function of generating license key information, which can effectively relieve the processing pressure of the authorization platform.

Figure 3:
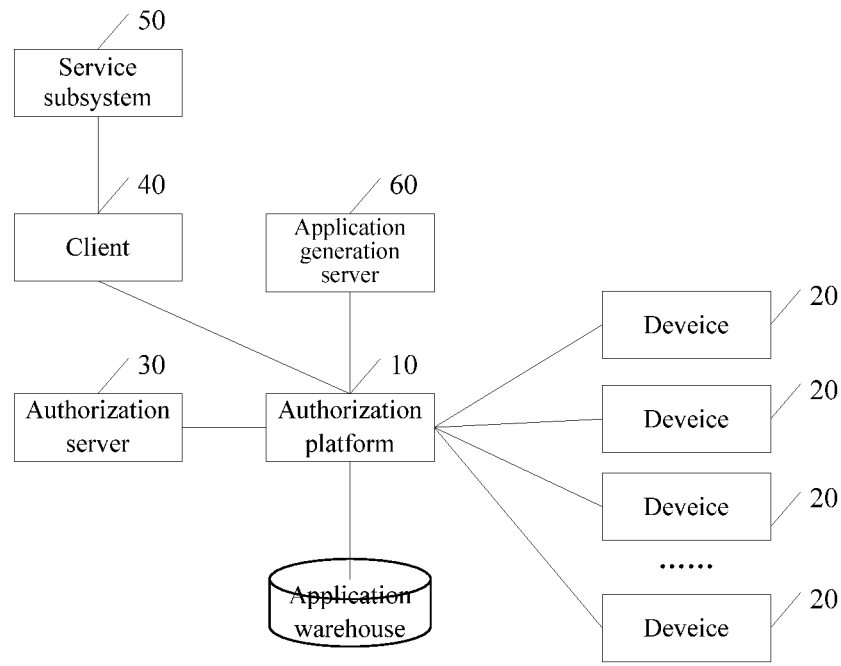
FIG. 3 is a schematic diagram of the architecture of an authorization verification system applied in embodiment 3 of the present application.

Referring to FIG. 3, FIG. 3 is a schematic diagram of the architecture of an authorization verification system applied in embodiment 3 of the present application, and FIG. 3 is an extension architecture of the system architecture shown in FIG. 1 or FIG. 2. As shown in FIG. 3, the system includes an authorization platform 10, a device 20, a client 40, a service subsystem 50 and an application generation server 60.

In this embodiment, the client 40 sends an application generation instruction to the authorization platform 10 to trigger the application generation process, and the authorization platform 10 instructs the application generation server 60 to generate an application and description information of the application.

Specifically, the client 40 is configured for sending an application generation instruction for the application to the authorization platform 10. The authorization platform 10 is configured for receiving the application generation instruction sent by the client 40, and based on the application generation instruction, instructing the application generation server 60 to generate the application and the description information of the application, packaging the data and description information of the application generated by the application generation server 60 into a software package, and storing the software package of the application in an application warehouse. Correspondingly, the application generation server 60 is configured for generating the application and the description information of the application according to an instruction of the authorization platform.

In an implementation of the embodiment of the present application, the application generation instruction may be sent by other clients that do not belong to the authorization verification system.

The manner of the authorization platform 10 instructing the application generation server 60 to generate the application and the description information of the application based on the application generation instruction may specifically be: the authorization platform 10 sends an instruction message to the application generation server 60, and the instruction message carries some parameter information, such as application size, name, etc. required for generating the application. After receiving the instruction message, the application generation server knows that the application needs to be generated, and then uses the locally stored relevant data required for generating application to generate the application, and the relevant data required for generating application and the specific generation process are not repeated because they are not the focus of this application.

In actual implementation, the application generation server 60 may not be used to generate the application, the authorization platform 10 may directly perform the operation of generating the application.

The above-mentioned application warehouse may be a storage space within the authorization platform 10, or may be a storage space independent of the authorization platform 10, which is not specifically limited here.

In this embodiment, the authorization platform 10 can obtain the information of the admission device of the application from a client 40.

In actual implementation, the client 40 can obtain the information of the admission device of the application in at least the following two ways, and submit it to the authorization platform 10.

First Way:

the user can log in to the client 40, directly input the information of the admission device 20a of the application into the client 40, and trigger an admission device input instruction, and the admission device input instruction carries the information of the admission device 20a input by the user on an information input interface.

In this case, the client 40 is configured for receiving the admission device input instruction for the application, reading the information of the admission device 20a from the admission device input instruction, carrying the information of the admission device 20a in an admission device submission instruction for the application, and sending the admission device submission instruction to the authorization platform 10.

Second Way:

the user has set the information of the admission device 20a of the application in a service subsystem 50 in advance, then after logging in to the client 40, the user can directly trigger an admission device import instruction for the application, thereby triggering the process that the client 40 obtains the information of the admission device 20a of the application from the service subsystem 50.

In this case, the client 40 is configured for receiving an admission device import instruction for the application, obtaining the information of the admission device 20a from the service subsystem 50, carrying the information of the admission device 20a in an admission device submission instruction for the application, and sending the admission device submission instruction to the authorization platform 10.

It can be seen that no matter which method the client 40 uses to obtain the information of the admission device, the information of the admission device will be carried in the admission device submission instruction and sent to the authorization platform 10. The authorization platform 10 is configured for receiving the admission device submission instruction sent by the client 40, and the information of the admission device can be obtained from the admission device submission instruction. In one implementation, device information carried in the admission device submission instruction is stored as the information of admission device. So far, the authorization platform obtains the information of the admission device 20a of the application.

In this embodiment, the authorization platform 10 can obtain the information of the target device of the application from the client 40.

In actual implementation, the user can log in to the client 40, directly input the information of the target device 20b of the application into the client 40, and trigger a target device input instruction, and the target device input instruction carries the information of the target device 20b input by the user.

In this case, the client 40 is configured for receiving the target device input instruction for the application, reading the information of the target device from the target device input instruction, carrying the information of the admission device 20b in a target device submission instruction for the application, and sending the target device submission instruction to the authorization platform 10. The authorization platform 10 is configured for receiving the target device submission instruction sent by the client, and the information of the target device can be obtained from the target device submission instruction. In one implementation, device information carried in the target device submission instruction is stored as the information of target device. After that, the authorization platform 10 can perform authorization verification and subsequent operations on the target device of the application according to the license key information.

It can be seen from the system shown in FIG. 3 that the application performs two authorization verifications on the target device of the application by combining online verification and offline verification, which can effectively improve the security of the application, and the authorization server is used to undertake the function of generating the license key information, so that the processing pressure of the authorization platform can be effectively alleviated. In addition, the application generation server is also used to undertake the function of generating the application and its description information, which can also effectively relieve the processing pressure of the authorization platform. Moreover, the application also provides a variety of specific implementation plans for obtaining admission device information and target device information of the application.

The authorization verification system provided by the embodiments of the present application is described in detail above, and the present application also provides an authorization verification method for an application applied to an authorization platform, which is described in detail below with reference to FIGS. 4, 5, 6 and 7.

Figure 4:
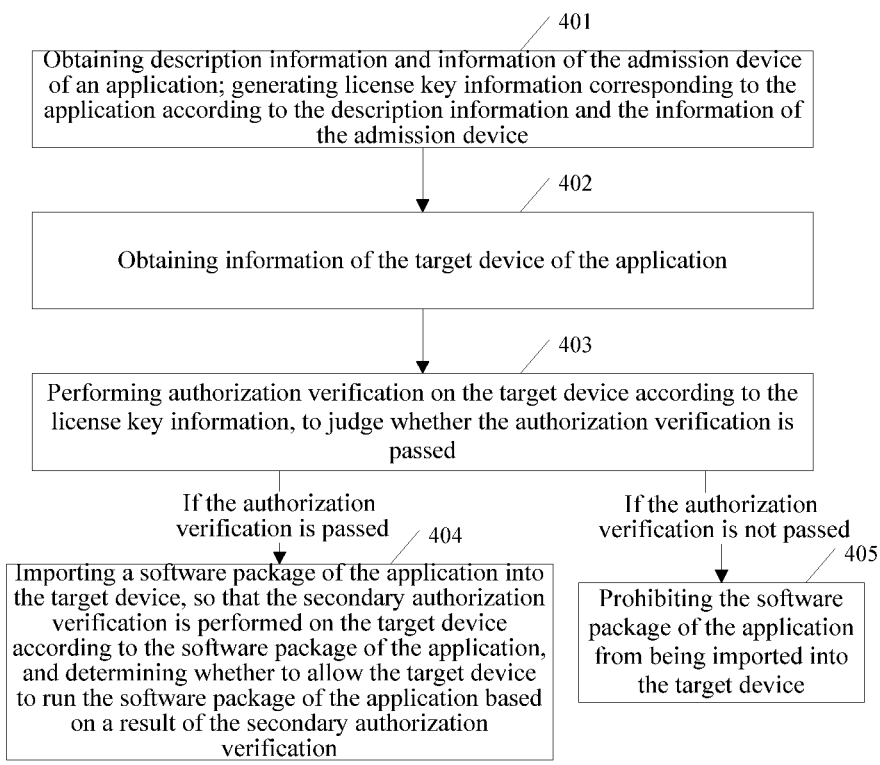
FIG. 4 is a flowchart of an authorization verification method applied in embodiment 1 of the present application.

Referring to FIG. 4, which is a flowchart of an authorization verification method applied in embodiment 1 of the present application, wherein the application is a combination of one or more of an algorithm model and a software; the method is applied to an authorization platform; as shown in FIG. 4, the method mainly includes the following steps.

Step 401, obtaining description information and information of the admission device of an application; generating license key information corresponding to the application according to the description information and the information of the admission device.

Step 402, obtaining information of the target device of the application.

Step 403, performing authorization verification on the target device according to the license key information, if the authorization verification is passed, performing step 404; otherwise, performing step 405.

Step 404, importing a software package of the application into the target device, so that the secondary authorization verification is performed on the target device according to the software package of the application, and determining whether to allow the target device to run the software package of the application based on a result of the secondary authorization verification.

Step 405, prohibiting the software package of the application from being imported into the target device.

It can be seen from the method shown in FIG. 4 that in the present application, the authorization verification is performed on the authorization platform for the target device of the application in an online manner, and the secondary authorization verification is performed on the target device of the application in an offline manner. The combination of online verification and offline verification performs two authorization verifications on the target device of the application, which can effectively improve the security of the application.

Figure 5:
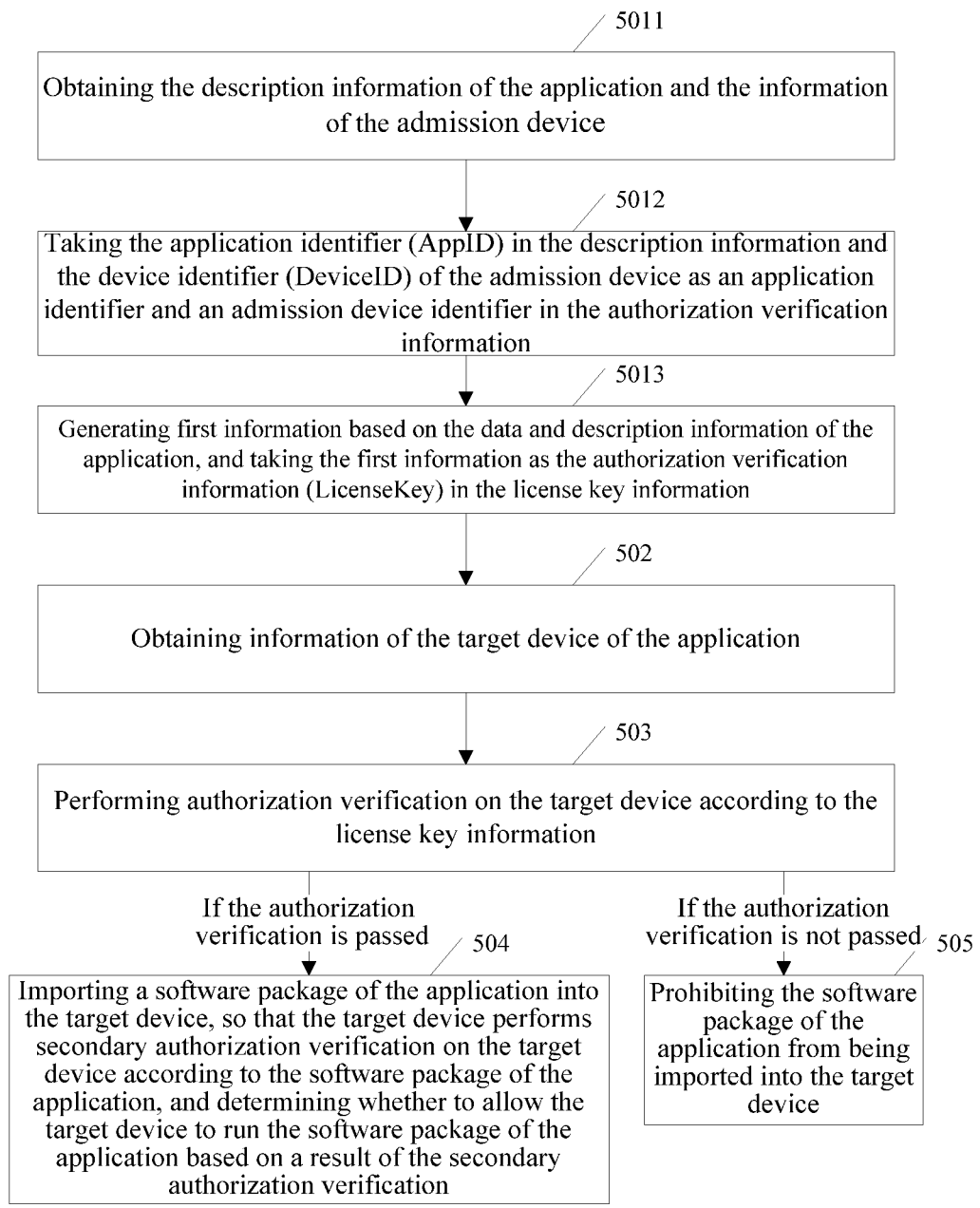
FIG. 5 is a flowchart of an authorization verification method applied in embodiment 2 of the present application.

Referring to FIG. 5, which is a flowchart of an authorization verification method applied in embodiment 2 of the present application, wherein the application is a combination of one or more of an algorithm model and a software; the method is applied to an authorization platform; as shown in FIG. 5, the method mainly includes the following steps.

Step 5011, obtaining the description information of the application and the information of the admission device.

Step 5012, taking the application identifier (AppID) in the description information and the device identifier (DeviceID) of the admission device as an application identifier and an admission device identifier in the authorization verification information.

Step 5013, generating first information based on the data and description information of the application, and taking the first information as the authorization verification information (LicenseKey) in the license key information.

The above steps 5011 to 5013 are an optional implementation of the step 401 shown in FIG. 4.

In this embodiment, the specific method of generating first information based on data of the application and the description information may be: encrypting the data and description information of the application or converting them based on a certain rule, and taking an encryption result or conversion result as the first information, wherein the certain rule may be a self-defined rule, wherein the rule for converting the data and description information of the application can play an encryption effect, which is not specifically limited in this application.

Step 502, obtaining information of the target device of the application.

Step 503, performing authorization verification on the target device according to the license key information, if the authorization verification is passed, performing step 504; otherwise, performing step 505.

Step 504, importing a software package of the application into the target device, so that the target device performs secondary authorization verification on the target device according to the software package of the application, and determining whether to allow the target device to run the software package of the application based on a result of the secondary authorization verification.

Step 505, prohibiting the software package of the application from being imported into the target device.

It can be seen from the method shown in FIG. 5 that in this application, the application identifier, the admission device identifier, and the authorization verification information are used as license key information, so as to provide multiple security guarantees for the security of the application. And in the present application, the authorization verification is performed on the authorization platform for the target device in an online manner, and the secondary authorization verification is performed on the target device of the application in an offline manner. The combination of online verification and offline verification performs two authorization verifications on the target device of the application, which can effectively improve the security of the application.

Figure 6:
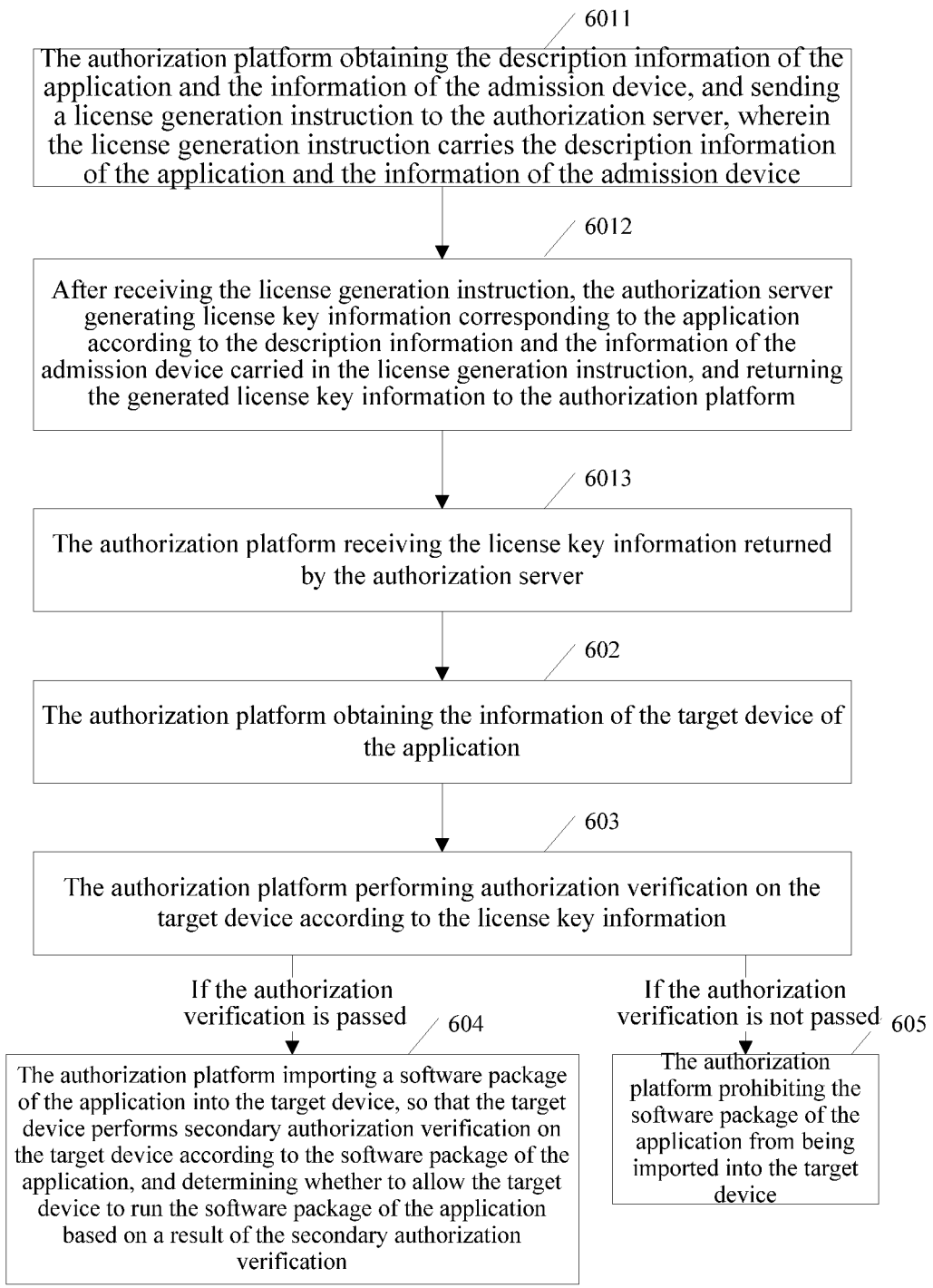
FIG. 6 is a flowchart of an authorization verification method applied in embodiment 3 of the present application.

Referring to FIG. 6, which is a flowchart of an authorization verification method applied in embodiment 3 of the present application, wherein the application is a combination of one or more of an algorithm model and a software; the method is applied to an authorization platform; as shown in FIG. 6, the method mainly includes the following steps.

Step 6011, the authorization platform obtaining the description information of the application and the information of the admission device, and sending a license generation instruction to the authorization server, wherein the license generation instruction carries the description information of the application and the information of the admission device.

The authorization platform sends the license generation instruction carrying the description information of the application and the information of the admission device to the authorization server, so that after receiving the license generation instruction, the authorization server can generate license key information corresponding to the application according to the description information and the information of the admission device carried in the license generation instruction, and return the generated license key information to the authorization platform, that is, step 6012.

Step 6012, after receiving the license generation instruction, the authorization server generating license key information corresponding to the application according to the description information and the information of the admission device carried in the license generation instruction, and returning the generated license key information to the authorization platform.

In this embodiment, the description information of the application includes an application identifier (AppID). The information of the admission device includes a device identifier (DeviceID); the license key information includes: an application identifier (AppID), an admission device identifier (DeviceID), and authorization verification information (LicenseKey).

The authorization server generating the license key information corresponding to the application according to the description information and the information of the admission device carried in the license generation instruction, which may specifically include: reading the description information and the information of the admission device from the license generation instruction; taking the application identifier in the description information and the device identifier of the admission device as an application identifier and an admission device identifier in the authorization verification information; generating first information based on the data and description information of the application, and taking the first information as the authorization verification information in the license key information.

In this embodiment, the specific method of generating first information based on data of the application and the description information may be: encrypting the data and description information of the application or converting them based on a certain rule, and taking an encryption result or conversion result as the first information, wherein the certain rule may be a self-defined rule, wherein the rule for converting the data and description information of the application can play an encryption effect, which is not specifically limited in this application.

Step 6013, the authorization platform receiving the license key information returned by the authorization server.

The above steps 6011-6013 are another optional implementations of the step 401 shown in FIG. 4.

Step 602: the authorization platform obtaining the information of the target device of the application.

Step 603: the authorization platform performing authorization verification on the target device according to the license key information, if the authorization verification is passed, performing step 604; otherwise, performing step 605.

In this embodiment, the description information of the application further includes an authorization mark (authorized). The authorized mark has two values, one is an allowable authorization mark value, and the other is a prohibited authorization mark value, which can be set by the application provider. When the authorization mark value in the description information of the application is the allowable authorization mark value (for example, true), it indicates that the application provider allows some devices to be authorized to use the application; when the authorization mark value in the description information of the application is the prohibited authorization mark value (for example, false), it indicates that the application is public, the application provider does not authorize the application, and any device is allowed to use the application.

Therefore, in one optional embodiment of the present application, the step of the authorization platform performing authorization verification on the target device according to the license key information may specifically include: if a value of the authorization mark is the allowable authorization mark value, the application identifier in the description information is the same as the application identifier in the license key information, and the device identifier of the target device is one device identifier in the license key information, determining that the authorization verification for the target device is passed; otherwise, determining that the authorization verification for the target device is not passed.

In practical applications, when authorizing a device to use an application, the authorization time limit may not be set, that is, the application can be used all the time after authorization; the authorization time limit can also be set, that is, the application is only authorized to be used within a limited time, and after the authorization time limit expires, if you want to continue to use the application, you need to submit the application to the authorization platform again as an admission device of the application, so that the authorization platform regenerates the license key information.

Therefore, in another optional embodiment of the present application, the license key information may further include: an effective time and an authorization time limit.

After generating the license key information corresponding to the application according to the description information and the information of the admission device, the authorization server may further set the effective time in the license key information as the current time; set the authorization time limit in the license key information to a preset time limit value.

Correspondingly, when the authorization platform performs authorization verification on the target device, it is also necessary to determine whether the authorization time limit has been reached.

Specifically, the step of the authorization platform performing authorization verification on the target device according to the license key information may include: calculating a time difference between current time and effective time in the license key information; comparing the time difference with the authorization time limit in the license key information; when the time difference is not less than the authorization time limit, determining that the authorization verification for the target device is not passed; when the time difference is less than the authorization time limit, if a value of the authorization mark is the allowable authorization mark value, the application identifier in the description information is the same as the application identifier in the license key information, and the device identifier of the target device is one device identifier in the license key information, determining that the authorization verification for the target device is passed; otherwise, determining that the authorization verification for the target device is not passed.

Step 604, the authorization platform importing a software package of the application into the target device, so that the target device performs secondary authorization verification on the target device according to the software package of the application, and determining whether to allow the target device to run the software package of the application based on a result of the secondary authorization verification.

In this embodiment, the target device uses the software package and license key information corresponding to the application to perform secondary authorization verification on the target device.

In an optional embodiment of the present application, after generating the license key information corresponding to the application, the authorization platform further imports the license key information into the admission device.

For the case that the license key information is imported into the admission device after the authorization platform generates the license key information corresponding to the application, the implementation of performing the secondary authorization verification on the target device according to the software package of the application can be divided into the following two types depending on whether the authorization time limit is included in the license key.

First, the license key information does not include an effective time and authorization time limit.

In this case, the step of the target device performing the secondary authorization verification on the target device according to the software package of the application may specifically include: determining whether the license key information has been imported into the target device when the software package of the application is run for the first time; if the license key information has been imported, unpacking the software package of the application to obtain data and description information of the application; generating first information based on the data and description information of the application, comparing the first information with the authorization verification information in the license key information; if the first information is the same as the authorization verification information in the license key information, determining that the secondary authorization verification for the target device is passed; if the first information is not the same with the authorization verification information in the license key information, determining that the secondary authorization verification for the target device is not passed; if the license key information is not imported, determining that the secondary authorization verification for the target device is not passed.

Second, the license key information also includes an effective time and authorization time limit.

In this case, the step of the target device performing the secondary authorization verification on the target device according to the software package of the application may specifically include: calculating a first time difference between the current time and the effective time in the license key information when the software package of the application is run for the first time, and comparing the first time difference with the authorization time limit in the license key information; if the first time difference is not less than the authorization time limit, determining that the secondary authorization verification for the target device is not passed; if the first time difference is less than the authorization time limit, performing the following operations: determining whether the license key information has been imported into the target device; if the license key information has been imported, unpacking the software package of the application to obtain data and description information of the application; generating first information based on the data and description information of the application, comparing the first information with the authorization verification information in the license key information; if the first information is the same as the authorization verification information in the license key information, determining that the secondary authorization verification for the target device is passed; if the first information is not the same with the authorization verification information in the license key information, determining that the secondary authorization verification for the target device is not passed; if the license key information is not imported, determining that the secondary authorization verification for the target device is not passed.

In addition, since the license key information has authorization time limit, each time the target device runs the software package of the application, it needs to first determine whether the software package of the application has reached the authorization time limit.

Therefore, after the step of secondary authorization verification for the target device according to the software package is passed, the target device further performs: calculating a second time difference between the current time and the effective time in the license key information when the software package of the application is run again, and comparing the second time difference with the authorization time limit in the license key information; if the second time difference is not less than the authorization time limit, prohibiting the target device from running the software package of the application again; if the second time difference is less than the authorization time limit, allowing the target device to run the software package of the application again.

In another optional embodiment of the present application, when the authorization platform imports the software package of the application into the target device, it may further import license key information into the target device.

For the case that the license key information is further imported into the target device when the authorization platform imports the software package of the application into the target device, the implementation of performing the secondary authorization verification on the target device according to the software package of the application can be divided into the following two types depending on whether the authorization time limit is included in the license key.

First, the license key information does not include an effective time and authorization time limit.

In this case, when the secondary authorization verification is performed on the target device according to the software package of the application, the target device further performs: unpacking, when the software package of the application is run for the first time, the software package of the application to obtain data and description information of the application; generating first information based on the data and description information of the application, comparing the first information with the authorization verification information in the license key information; if the first information is the same as the authorization verification information in the license key information, determining that the secondary authorization verification for the target device is passed; otherwise, determining that the secondary authorization verification for the target device is not passed.

Second, the license key information also includes an effective time and authorization time limit.

In this case, when the target device performs the secondary authorization verification on the target device according to the software package of the application, it may include: calculating a first time difference between the current time and the effective time in the license key information when the software package of the application is run for the first time, and comparing the first time difference with the authorization time limit in the license key information; if the first time difference is not less than the authorization time limit, determining that the secondary authorization verification for the target device is not passed; if the first time difference is less than the authorization time limit, performing the following operations: unpacking the software package of the application to obtain data and description information of the application; generating first information based on the data and description information of the application, comparing the first information with the authorization verification information in the license key information; if the first information is the same as the authorization verification information in the license key information, determining that the secondary authorization verification for the target device is passed; otherwise, determining that the secondary authorization verification for the target device is not passed.

In addition, since the license key information has authorization time limit, each time the target device runs the software package of the application, it needs to first determine whether the software package of the application has reached the authorization time limit.

Therefore, after the secondary authorization verification for the target device according to the software package is passed, it may also include: calculating a second time difference between the current time and the effective time in the license key information when the software package of the application is run again, and comparing the second time difference with the authorization time limit in the license key information; if the second time difference is not less than the authorization time limit, prohibiting the target device from running the software package of the application again; if the second time difference is less than the authorization time limit, allowing the target device to run the software package of the application again.

Step 605, the authorization platform prohibiting the software package of the application from being imported into the target device.

It can be seen from the method shown in FIG. 6 that the present application performs two authorization verifications on the target device of the application through a combination of online verification and offline verification, which can effectively improve the security of the application. In addition, the present application also uses an authorization server to undertake the function of generating license key information, which can effectively relieve the processing pressure of the authorization platform.

Figure 7:
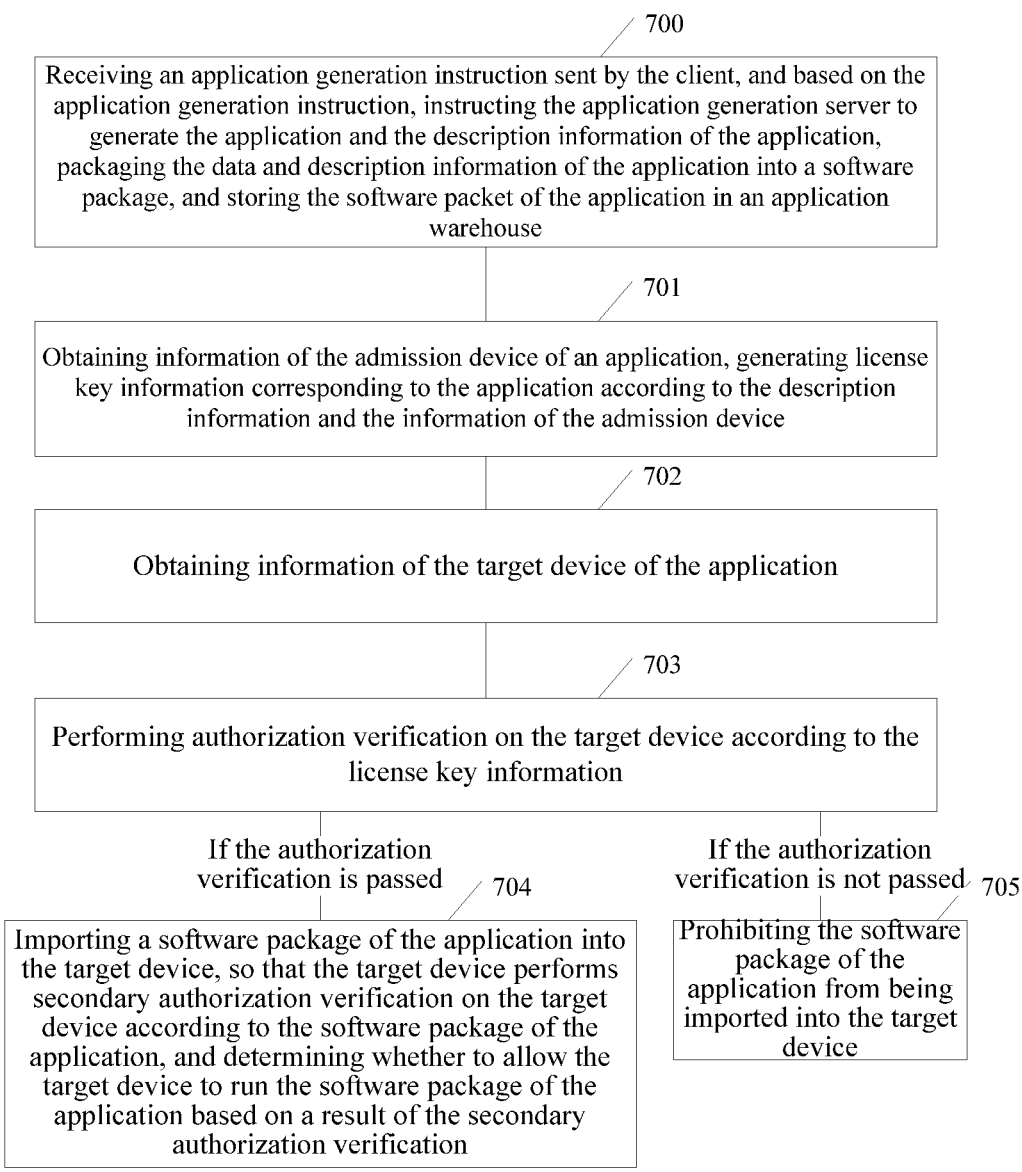
FIG. 7 is a flowchart of an authorization verification method applied in embodiment 4 of the present application.

Referring to FIG. 7, which is a flowchart of an authorization verification method applied in embodiment 4 of the present application, wherein the application is a combination of one or more of an algorithm model and a software; the method is applied to an authorization platform; as shown in FIG. 7, the method mainly includes the following steps.

Step 700, receiving an application generation instruction sent by the client, and based on the application generation instruction, instructing the application generation server to generate the application and the description information of the application, packaging the data and description information of the application into a software package, and storing the software package of the application in an application warehouse.

Step 701, obtaining information of the admission device of an application; generating license key information corresponding to the application according to the description information and the information of the admission device.

In this embodiment, the authorization platform obtains the information of the admission device from a client, and the client can know the admission device information of the application in the following two ways.

First Way, the user can log in to the client, directly input the information of the admission device of the application into the client, and trigger an admission device input instruction, and the admission device input instruction carries the information of the admission device input by the user in an information input interface.

In this case, the client receives the admission device input instruction for the application, reads the information of the admission device from the admission device input instruction, carries the information of the admission device in an admission device submission instruction for the application, and sends the admission device submission instruction to the authorization platform.

Second Way, the user has set the information of the admission device of the application in a service subsystem in advance, then after logging in to the client, the user can directly trigger an admission device import instruction for the application, thereby triggering the process for the client to obtain the information of the admission device of the application from the service subsystem.

In this case, the client receives an admission device import instruction for the application, obtains the information of the admission device from the service subsystem, carrying the information of the admission device in an admission device submission instruction for the application, and sending the admission device submission instruction to the authorization platform.

It can be seen that:

in an optional embodiment of the present application, the step of the authorization platform obtaining the admission device information of the application may specifically include: receiving an admission device submission instruction for the application sent by the client, and storing device information carried in the admission device submission instruction as information of the admission device; wherein the device information carried in the admission device submission instruction is obtained from an admission device input instruction after the client receives the admission device input instruction for the application.

It can be seen that in another optional embodiment of the present application, the step of the authorization platform obtaining the admission device information of the application may specifically include: receiving an admission device submission instruction for the application sent by the client, and storing device information carried in the admission device submission instruction as information of the admission device; wherein the device information carried in the admission device submission instruction is obtained from a service subsystem based on an admission device import instruction after the client receives the admission device import instruction for the application.

In addition, the specific implementation principle of the authorization platform generating the license key information according to the description information and the information of the admission device is the same as the implementation principle in the embodiments of the present application shown in FIG. 4 and FIG. 5 and which will not be repeated.

Step 702, obtaining information of the target device of the application.

In this embodiment, the step of the authorization platform obtaining the target device information of the application may specifically include: receiving a target device submission instruction for the application sent by the client, and storing device information carried in the target device submission instruction as information of the target device; wherein the device information carried in the target device submission instruction is obtained from a target device input instruction after the client receives the target device input instruction for the application.

Step 703, performing authorization verification on the target device according to the license key information, if the authorization verification is passed, performing step 704; otherwise, performing step 705.

Step 704, importing a software package of the application into the target device, so that the target device performs secondary authorization verification on the target device according to the software package of the application, and determining whether to allow the target device to run the software package of the application based on a result of the secondary authorization verification.

Step 705, prohibiting the software package of the application from being imported into the target device.

The implementation principle of the above steps 703-705 is the same as the implementation principle of the steps 603-605 in FIG. 6, which will not be repeated.

It can be seen from the method shown in FIG. 7 that the application performs two authorization verifications on the target device of the application by combining online verification and offline verification, which can effectively improve the security of the application, and the authorization server is used to undertake the function of generating the license key information, so that the processing pressure of the authorization platform can be effectively alleviated. In addition, the application generation server is also used to undertake the function of generating the application and its description information, which can also effectively relieve the processing pressure of the authorization platform. Moreover, the application also provides a variety of specific implementation solutions for obtaining admission device information and target device information.

The embodiments of the present application also provide an authorization verification method for an application applied to a target device of the application, which will be described in detail below with reference to FIGS. 8, 9 and 10.

Figure 8:
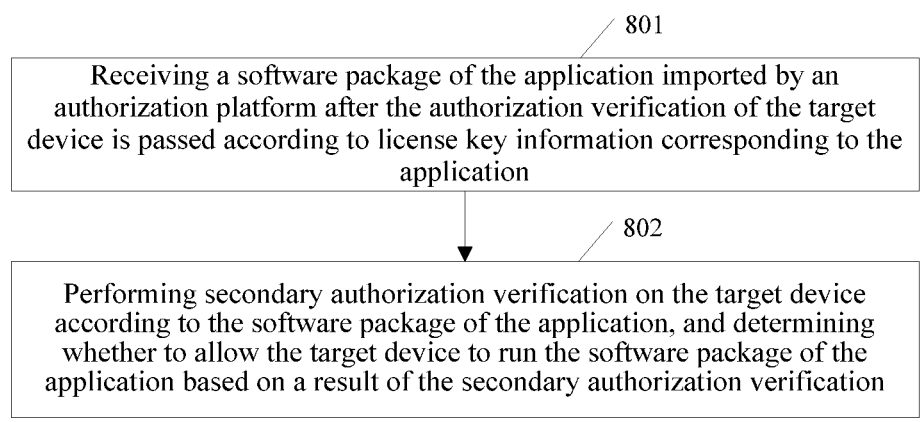
FIG. 8 is a flowchart of an authorization verification method applied in embodiment 5 of the present application.

Referring to FIG. 8, which is a flowchart of an authorization verification method applied in embodiment 5 of the present application, wherein the application is a combination of one or more of an algorithm model and a software; the method is applied to a target device of the application; as shown in FIG. 8, the method mainly includes the following steps.

Step 801, receiving a software package of the application imported by an authorization platform after the authorization verification for the target device is passed according to license key information corresponding to the application.

Step 802, performing secondary authorization verification on the target device according to the software package of the application, and determining whether to allow the target device to run the software package of the application based on a result of the secondary authorization verification.

It can be seen from the method shown in FIG. 8 that in the present application, the authorization verification is performed on the authorization platform for the target device in an online manner, and the secondary authorization verification is performed on the target device of the application in an offline manner. The combination of online verification and offline verification performs two authorization verifications on the target device of the application, which can effectively improve the security of the application. Moreover, in this application, the license key information is only sent to the admission device of the application, so that it can be ensured that only the admission device can pass the secondary verification, which can further ensure the security of the application.

Figure 9:
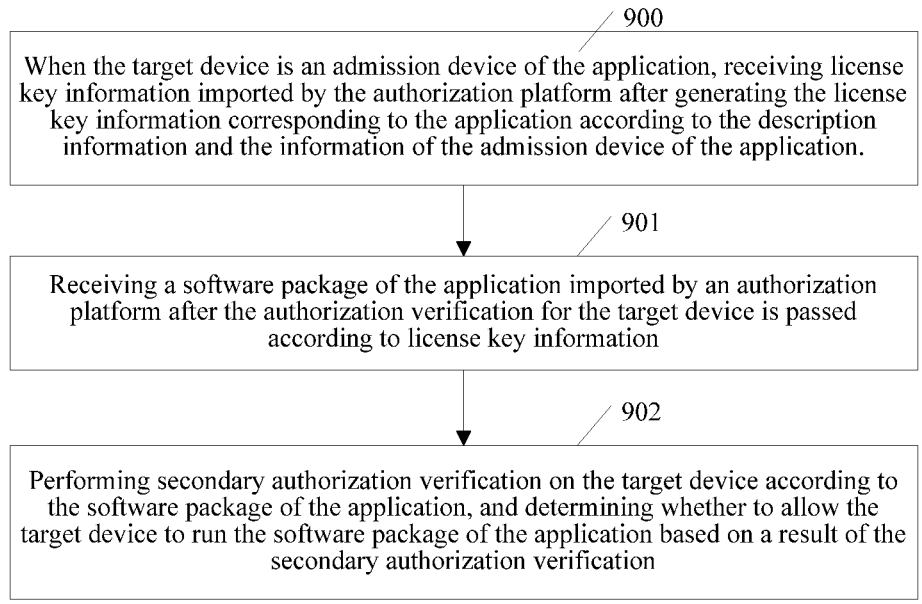
FIG. 9 is a flowchart of an authorization verification method applied in embodiment 6 of the present application.

Referring to FIG. 9, which is a flowchart of an authorization verification method applied in embodiment 6 of the present application, wherein the application is a combination of one or more of an algorithm model and a software; the method is applied to a target device of the application; as shown in FIG. 9, the method mainly includes the following steps.

Step 900, when the target device is an admission device of the application, receiving license key information imported by the authorization platform after generating the license key information corresponding to the application according to the description information and the information of the admission device of the application.

In this embodiment, the license key information corresponding to the application includes authorization authentication information; the authorization authentication information is the first information generated based on data and description information of the application.

Step 901, receiving a software package of the application imported by an authorization platform after the authorization verification for the target device is passed according to license key information.

Step 902, performing secondary authorization verification on the target device according to the software package of the application, and determining whether to allow the target device to run the software package of the application based on a result of the secondary authorization verification.

In practical applications, when authorizing a device to use an application, the authorization time limit may not be set, that is, the application can be used all the time after authorization; the authorization time limit can also be set, that is, the application is only authorized to be used within a limited time, and after the authorization time limit expires, if you want to continue to use the application, you need to submit the application to the authorization platform again as an admission device of the application, so that the authorization platform regenerates the license key information.

In this embodiment, the implementation of performing secondary authorization verification on the target device according to the software package of the application can be divided into the following two types depending on whether the license key corresponding to the application includes the authorization time limit.

First, the license key information does not include effective time and authorization time limit.

In this case, the step of performing secondary authorization verification on the target according to the software package of the application may specifically include: determining whether the license key information has been imported into the target device when the software package of the application is run for the first time; if the license key information has been imported, unpacking the software package of the application to obtain data and description information of the application; generating first information based on the data and description information of the application, comparing the first information with the authorization verification information in the license key information; if the first information is the same as the authorization verification information in the license key information, determining that the secondary authorization verification for the target device is passed; otherwise, determining that the secondary authorization verification for the target device is not passed; if the license key information is not imported, determining that the secondary authorization verification for the target device is not passed.

Second, the license key information includes effective time and authorization time limit.

In this case, the step of performing secondary authorization verification on the target device according to the software package of the application may specifically include: calculating a first time difference between the current time and the effective time in the license key information when the software package of the application is run for the first time, and comparing the first time difference with the authorization time limit in the license key information; if the first time difference is not less than the authorization time limit, determining that the secondary authorization verification for the target device is not passed; if the first time difference is less than the authorization time limit, performing the following operations: determining whether the license key information has been imported into the target device; if the license key information has been imported, unpacking the software package of the application to obtain data and description information of the application; generating first information based on the data and description information of the application, comparing the first information with the authorization verification information in the license key information; if the first information is the same as the authorization verification information in the license key information, determining that the secondary authorization verification for the target device is passed; otherwise, determining that the secondary authorization verification for the target device is not passed; if the license key information is not imported, determining that the secondary authorization verification for the target device is not passed.

In addition, due to the authorization time limit, every time the application runs, it is necessary to check whether the authorization time limit is exceeded.

Therefore, in this embodiment, after the secondary authorization verification for the target device according to the software package is passed, the step may also include: calculating a second time difference between the current time and the effective time in the license key information when the software package of the application is run again, and comparing the second time difference with the authorization time limit in the license key information; if the second time difference is not less than the authorization time limit, prohibiting the target device from running the software package of the application again; if the second time difference is less than the authorization time limit, allowing the target device to run the software package of the application again.

It can be seen from the method shown in FIG. 9 that in the present application, the authorization verification is performed on the authorization platform for the target device in an online manner, and the secondary authorization verification is performed on the target device of the application in an offline manner. The combination of online verification and offline verification performs two authorization verifications on the target device of the application, which can effectively improve the security of the application.

Figure 10:
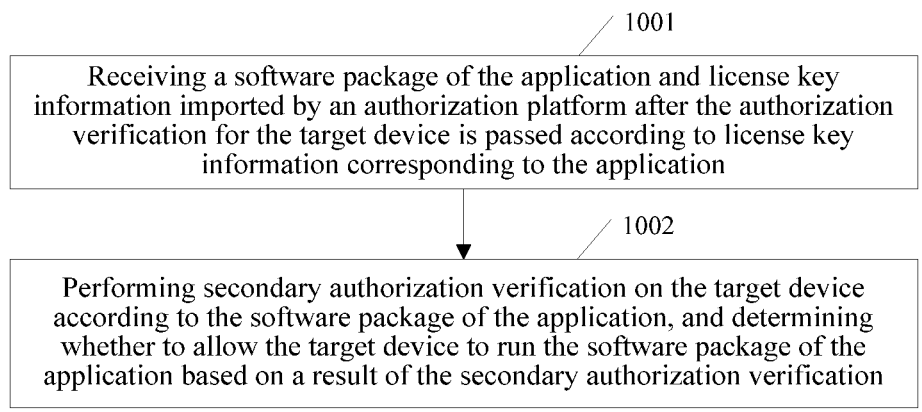
FIG. 10 is a flowchart of an authorization verification method applied in embodiment 7 of the present application.

Referring to FIG. 10, which is a flowchart of an authorization verification method applied in embodiment 7 of the present application, wherein the application is a combination of one or more of an algorithm model and a software; the method is applied to a target device of the application; as shown in FIG. 10, the method mainly includes the following steps.

Step 1001, receiving a software package of the application and license key information imported by an authorization platform after the authorization verification for the target device is passed according to license key information corresponding to the application.

Step 1002, performing secondary authorization verification on the target device according to the software package of the application, and determining whether to allow the target device to run the software package of the application based on a result of the secondary authorization verification.

In practical applications, when authorizing a device to use an application, the authorization time limit may not be set, that is, the application can be used all the time after authorization; the authorization time limit can also be set, that is, the application is only authorized to be used within a limited time, and after the authorization time limit expires, if you want to continue to use the application, you need to submit the application to the authorization platform again as an admission device of the application, so that the authorization platform regenerates the license key information.

In this embodiment, the implementation of performing secondary authorization verification on the target device according to the software package of the application can be divided into the following two types depending on whether the license key includes the authorization time limit.

First, the license key information does not include effective time and authorization time limit.

In this case, the step of performing the secondary authorization verification on the target device according to the software package of the application may specifically include: unpacking, when the software package of the application is run for the first time, the software package of the application to obtain data and description information of the application; generating first information based on the data and description information of the application, comparing the first information with the authorization verification information in the license key information; if the first information is the same as the authorization verification information in the license key information, determining that the secondary authorization verification for the target device is passed; otherwise, determining that the secondary authorization verification for the target device is not passed.

Second, the license key information includes effective time and authorization time limit.

In this case, the step of performing the secondary authorization verification on the target device according to the software package of the application may specifically include: calculating a first time difference between the current time and the effective time in the license key information when the software package of the application is run for the first time, and comparing the first time difference with the authorization time limit in the license key information; if the first time difference is not less than the authorization time limit, determining that the secondary authorization verification for the target device is not passed; if the first time difference is less than the authorization time limit, performing the following operations: unpacking the software package of the application to obtain data and description information of the application; generating first information based on the data and description information of the application, comparing the first information with the authorization verification information in the license key information; if the first information is the same as the authorization verification information in the license key information, determining that the secondary authorization verification for the target device is passed; otherwise, determining that the secondary authorization verification for the target device is not passed.

In addition, due to the authorization time limit, every time the application runs, it is necessary to check whether the authorization time limit is exceeded.

Therefore, in this embodiment, after the secondary authorization verification for the target device according to the software package is passed, the step may also include: calculating a second time difference between the current time and the effective time in the license key information when the software package of the application is run again, and comparing the second time difference with the authorization time limit in the license key information; if the second time difference is not less than the authorization time limit, prohibiting the target device from running the software package of the application again; if the second time difference is less than the authorization time limit, allowing the target device to run the software package of the application again.

It can be seen from the method shown in FIG. 10 that in the present application, the authorization verification is performed on the authorization platform for the target device in an online manner, and the secondary authorization verification is performed on the target device of the application in an offline manner. The combination of online verification and offline verification performs two authorization verifications on the target device of the application, which can effectively improve the security of the application. Moreover, in this application, the license key information is only sent to the target device when the software package of the application is imported, so that the license key information can be prevented from occupying the storage resources of the target device prematurely.

The embodiments of the present application further provides two authorization verification apparatuses of applications, one of which is applied to the authorization platform and the other is applied to the target device of the application, which will be described in detail below with reference to FIG. 11 and FIG. 12.

Figure 11:
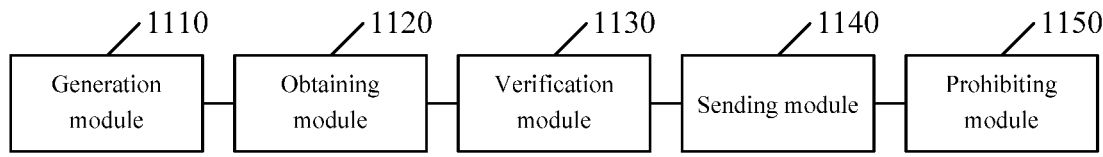
FIG. 11 is a schematic diagram of the virtual apparatus structure of an authorization verification apparatus applied in embodiment 1 of the present application.

Referring to FIG. 11, which is a schematic structural diagram of an authorization verification apparatus of an application, wherein the application is a combination of one or more of an algorithm model and a software; the apparatus is applied to an authorization platform, including:

a generating module 1110, configured for obtaining description information and information of the admission device of an application; generating license key information corresponding to the application according to the description information and the information of the admission device;

an obtaining module 1120, configured for obtaining information of the target device of the application;

a verification module 1130, configured for performing authorization verification on the target device according to the license key information;

a sending module 1140, configured for importing a software package of the application into the target device if the authorization verification for the target device is passed, so that the target device performs secondary authorization verification on the target device according to the software package of the application, and determining whether to allow the target device to run the software package of the application based on a result of the secondary authorization verification;

a prohibiting module 1150, configured for prohibiting the software package of the application from being imported into the target device if the authorization verification on the target device is not passed.

Optionally, the apparatus may also include:

a receiving module, configured for receiving an application generation instruction sent by a client;

an instruction module, configured for instructing an instruction generation server to generate an application and description information of the application based on the application generation instruction;

a storage module, configured for packaging data and description information of the application into a software package, and storing the software package of the application in an application warehouse.

Optionally, the generation module 1110 can specifically be configured for: receiving an admission device submission instruction for the application sent by the client, and storing device information carried in the admission device submission instruction as information of the admission device; wherein the device information carried in the admission device submission instruction is obtained from an admission device input instruction after the client receives the admission device input instruction for the application.

The obtaining module 1120 can specifically be configured for: receiving a target device submission instruction for the application sent by the client, and storing device information carried in the target device submission instruction as information of the target device; wherein the device information carried in the target device submission instruction is obtained from a target device input instruction after the client receives the target device input instruction for the application.

Optionally, the generation module 1110 can specifically be configured for: receiving an admission device submission instruction for the application sent by the client, and storing device information carried in the admission device submission instruction as information of the admission device; wherein the device information carried in the admission device submission instruction is obtained from a service subsystem based on an admission device import instruction after the client receives the admission device import instruction for the application.

The obtaining module 1120 can specifically be configured for: receiving a target device submission instruction for the application sent by the client, and storing device information carried in the target device submission instruction as information of the target device; wherein the device information carried in the target device submission instruction is obtained from a target device input instruction after the client receives the target device input instruction for the application.

Optionally, the description information may include an application identifier; the information of the admission device may include a device identifier; the license key information may include: an application identifier, an admission device identifier and authorization verification information.

The generation module 1110 can specifically be configured for taking the application identifier in the description information and the device identifier of the admission device as the application identifier and the admission device identifier in the license key information respectively; generating first information based on data of the application and the description information, and taking the first information as the authorization verification information of the license key information.

Optionally, the description information may include an application identifier; the information of the admission device may include a device identifier; the license key information may include: an application identifier, an admission device identifier and authorization verification information.

The generation module 1110 can specifically be configured for sending a license generation instruction to the authorization server, and the license generation instruction carries the description information and the information of the admission device, so that after receiving the license generation instruction, the authorization server generating the license key information corresponding to the application according to the description information and the information of the admission device carried in the license generation instruction, and returning the license key information to the authorization platform; receiving the license key information returned by the authorization server; wherein, the step of the authorization server generating the license key information corresponding to the application according to the description information and the information of the admission device carried in the license generation instruction includes: reading the description information and the information of the admission device from the license generation instruction; taking the application identifier in the description information and the device identifier of the admission device as the application identifier of the license key information and the admission device identifier; generating first information based on data and description information of the application, and taking the first information as the authorization verification information of the license key information.

Optionally, the description information may also include an authorization mark.

The verification module 1130 can specifically be configured for, if a value of the authorization mark is the allowable authorization mark value, the application identifier in the description information is the same as the application identifier in the license key information, and the device identifier of the target device is one device identifier in the license key information, determining that the authorization verification for the target device is passed; otherwise, determining that the authorization verification for the target device is not passed.

Optionally, the description information may also include an authorization mark; the license key information may also include: an effective time and an authorization time limit.

The verification module 1130 can specifically be configured for calculating a time difference between current time and effective time in the license key information; comparing the time difference with the authorization time limit in the license key information; when the time difference is not less than the authorization time limit, determining that the authorization verification for the target device is not passed; when the time difference is less than the authorization time limit, if a value of authorization mark is the allowable authorization mark value, the application identifier in the description information is the same as the application identifier in the license key information, and the device identifier of the target device is one device identifier in the license key information, determining that the authorization verification for the target device is passed; otherwise, determining that the authorization verification for the target device is not passed.

Figure 12:
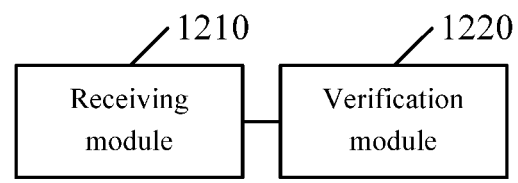
FIG. 12 is a schematic diagram of the virtual apparatus structure of an authorization verification apparatus applied in embodiment 2 of the present application.

Referring to FIG. 12, which is a schematic structural diagram of an authorization verification apparatus of an application, wherein the application is a combination of one or more of an algorithm model and a software; the apparatus is applied to a target device of the application, including:

a receiving module 1210, configured for receiving a software package of the application imported by an authorization platform after the authorization verification for the target device is passed according to license key information corresponding to the application;

a verification module 1220, configured for performing secondary authorization verification on the target device according to the software package of the application, and determining whether to allow the target device to run the software package of the application based on a result of the secondary authorization verification.

Optionally, the receiving module 1210 can also be configured for receiving license key information imported by the authorization platform after generating the license key information corresponding to the application according to the description information and the information of the admission device of the application when the target device is the admission device of the application; the license key information includes authorization verification information; the authorization verification information is the first information generated based on data and description information of the application;

the verification module 1220 can specifically be configured for determining whether the license key information has been imported into the target device when the software package of the application is run for the first time; if the license key information has been imported, unpacking the software package of the application to obtain data and description information of the application; generating first information based on the data and description information of the application, comparing the first information with the authorization verification information in the license key information; if the first information is the same as the authorization verification information in the license key information, determining that the secondary authorization verification for the target device is passed; otherwise, determining that the secondary authorization verification for the target device is not passed; if the license key information is not imported, determining that the secondary authorization verification for the target device is not passed.

Optionally, the receiving module 1210 can also be configured for receiving the license key information imported by the authorization platform after generating the license key information corresponding to the application according to the description information and the information of the admission device of the application when the target device is the admission device of the application; the license key information includes authorization verification information, an effective time and authorization time limit; the authorization verification information is the first information generated based on data and description information of the application;

the verification module 1220 is specifically configured for calculating a first time difference between the current time and the effective time in the license key information when the software package of the application is run for the first time, and comparing the first time difference with the authorization time limit in the license key information; if the first time difference is not less than the authorization time limit, determining that the secondary authorization verification for the target device is not passed; if the first time difference is less than the authorization time limit, performing the following operations: determining whether the license key information has been imported into the target device; if the license key information has been imported, unpacking the software package of the application to obtain data and description information of the application; generating first information based on the data and description information of the application, comparing the first information with the authorization verification information in the license key information; if the first information is the same as the authorization verification information in the license key information, determining that the secondary authorization verification for the target device is passed; otherwise, determining that the secondary authorization verification for the target device is not passed; if the license key information is not imported, determining that the secondary authorization verification for the target device is not passed.

The apparatus may also include:

a calculating module, configured for calculating a second time difference between the current time and the effective time in the license key information when the software package of the application is run again, and comparing the second time difference with the authorization time limit in the license key information;

a prohibiting module, configured for prohibiting the target device from running the software package of the application again if the second time difference is not less than the authorization time limit;

an allowing module, configured for allowing the target device to run the software package of the application again if the second time difference is less than the authorization time limit.

Optionally, the receiving module 1210 can also be configured for receiving the license key information corresponding to the application imported by the authorization platform; the license key information includes authorization verification information; and the authorization authentication information is the first information generated based on the data and description information of the application;

the verification module 1220 can specifically be configured for unpacking, when the software package of the application is run for the first time, the software package of the application to obtain data and description information of the application; generating first information based on the data and description information of the application, comparing the first information with the authorization verification information in the license key information; if the first information is the same as the authorization verification information in the license key information, determining that the secondary authorization verification for the target device is passed; otherwise, determining that the secondary authorization verification for the target device is not passed.

Optionally, the receiving module 1210 can also be configured for receiving the license key information corresponding to the application imported by the authorization platform; the license key information includes authorization verification information, an effective time and authorization time limit; and the authorization authentication information is the first information generated based on the data and description information of the application;

the verification module can specifically be configured for calculating a first time difference between the current time and the effective time in the license key information when the software package of the application is run for the first time, and comparing the first time difference with the authorization time limit in the license key information; if the first time difference is not less than the authorization time limit, determining that the secondary authorization verification for the target device is not passed; if the first time difference is less than the authorization time limit, performing the following operations: unpacking the software package of the application to obtain data and description information of the application; generating first information based on the data and description information of the application, comparing the first information with the authorization verification information in the license key information; if the first information is the same as the authorization verification information in the license key information, determining that the secondary authorization verification for the target device is passed; otherwise, determining that the secondary authorization verification for the target device is not passed.

The apparatus further includes:

a calculating module, configured for calculating a second time difference between the current time and the effective time in the license key information when the software package of the application is run again, and comparing the second time difference with the authorization time limit in the license key information;

a prohibiting module, configured for prohibiting the target device from running the software package of the application again if the second time difference is not less than the authorization time limit;

an allowing module, configured for allowing the target device to run the software package of the application again if the second time difference is less than the authorization time limit.

The embodiment of the present application further provides two authorization verification apparatuses of two applications, one of which is applied to the authorization platform and the other is applied to the target device of the application, which will be described in detail below with reference to FIG. 13 and FIG. 14.

Figure 13:
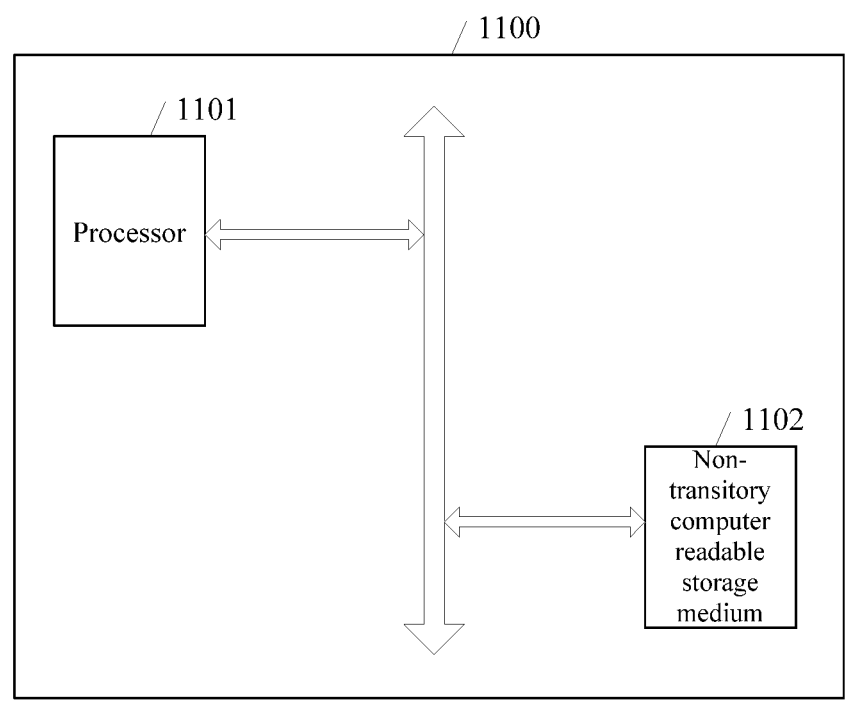
FIG. 13 is a schematic diagram of the physical apparatus structure of an authorization verification apparatus applied in embodiment 1 of the present application.

Referring to FIG. 13, which is a schematic diagram of the architecture of an authorization verification apparatus applied in embodiment 1 of the present application, wherein the application is a combination of one or more of an algorithm model and a software; the apparatus 1100 is applied to the authorization platform. As shown in FIG. 13, the apparatus 1100 includes: a processor 1101 and a non-transitory computer readable storage medium 1102 connected with the processor 1101 through a bus;

the non-transitory computer readable storage medium 1102 stores one or more computer programs executable by the processor 1101; the processor 1101 implements the following steps when executing one or more computer programs:

obtaining description information and information of the admission device of an application; generating license key information corresponding to the application according to the description information and the information of the admission device;

obtaining information of the target device of the application;

performing authorization verification on the target device according to the license key information;

if the authorization verification for the target device is passed, importing a software package of the application into the target device, so that the target device performs secondary authorization verification on the target device according to the software package of the application, and determining whether to allow the target device to run the software package of the application based on a result of the secondary authorization verification;

if the authorization verification for the target device is not passed, prohibiting the software package of the application from being imported into the target device.

Optionally, the processor 1101 can be specifically configured for receiving the application generation instruction sent by the client, and based on the application generation instruction, instructing the application generation server to generate the application and the description information of the application, packaging the data and description information of the application into a software package, and storing the software package of the application in an application warehouse.

Optionally, the processor 1101 can specifically be configured for: receiving an admission device submission instruction for the application sent by the client, and storing device information carried in the admission device submission instruction as information of the admission device; wherein the device information carried in the admission device submission instruction is obtained from an admission device input instruction after the client receives the admission device input instruction for the application;

receiving a target device submission instruction for the application sent by the client, and storing device information carried in the target device submission instruction as information of the target device; wherein the device information carried in the target device submission instruction is obtained from a target device input instruction after the client receives the target device input instruction for the application.

Optionally, the processor 1101 can specifically be configured for: receiving an admission device submission instruction for the application sent by the client, and storing device information carried in the admission device submission instruction as information of the admission device; wherein the device information carried in the admission device submission instruction is obtained from a service subsystem based on an admission device import instruction after the client receives the admission device import instruction for the application;

receiving a target device submission instruction for the application sent by the client, and storing device information carried in the target device submission instruction as information of the target device; wherein the device information carried in the target device submission instruction is obtained from a target device input instruction after the client receives the target device input instruction for the application.

Optionally, the description information may include an application identifier; the information of the admission device may include a device identifier; the license key information may include: an application identifier, an admission device identifier and authorization verification information;

the processor 1101 can specifically be configured for taking the application identifier in the description information and the device identifier of the admission device as the application identifier and the admission device identifier in the license key information respectively; generating first information based on data of the application and the description information, and taking the first information as the authorization verification information of the license key information.

Optionally, the description information may include an application identifier; the information of the admission device may include a device identifier; the license key information may include: an application identifier, an admission device identifier and authorization verification information.

The processor 1101 can specifically be configured for sending a license generation instruction to the authorization server, and the license generation instruction carries the description information and the information of the admission device, so that after receiving the license generation instruction, the authorization server generating the license key information corresponding to the application according to the description information and the information of the admission device carried in the license generation instruction, and returning the license key information to the authorization platform; receiving the license key information returned by the authorization server; wherein, the step of the authorization server generating the license key information corresponding to the application according to the description information and the information of the admission device carried in the license generation instruction includes: reading the description information and the information of the admission device from the license generation instruction; taking the application identifier in the description information and the device identifier of the admission device as the application identifier of the license key information and the admission device identifier; generating first information based on data and description information of the application, and taking the first information as the authorization verification information of the license key information.

Optionally, the description information may also include an authorization mark.

The processor 1101 can specifically be configured for, if a value of the authorization mark is the allowable authorization mark value, the application identifier in the description information is the same as the application identifier in the license key information, and the device identifier of the target device is one device identifier in the license key information, determining that the authorization verification for the target device is passed; otherwise, determining that the authorization verification for the target device is not passed.

Optionally, the description information may also include an authorization mark; the license key information may also include: an effective time and authorization time limit.

The processor 1101 can specifically be configured for calculating a time difference between current time and effective time in the license key information; comparing the time difference with the authorization time limit in the license key information; when the time difference is not less than the authorization time limit, determining that the authorization verification for the target device is not passed; when the time difference is less than the authorization time limit, if a value of the authorization mark is the allowable authorization mark value, the application identifier in the description information is the same as the application identifier in the license key information, and the device identifier of the target device is one device identifier in the license key information, determining that the authorization verification for the target device is passed; otherwise, determining that the authorization verification for the target device is not passed.

Figure 14:
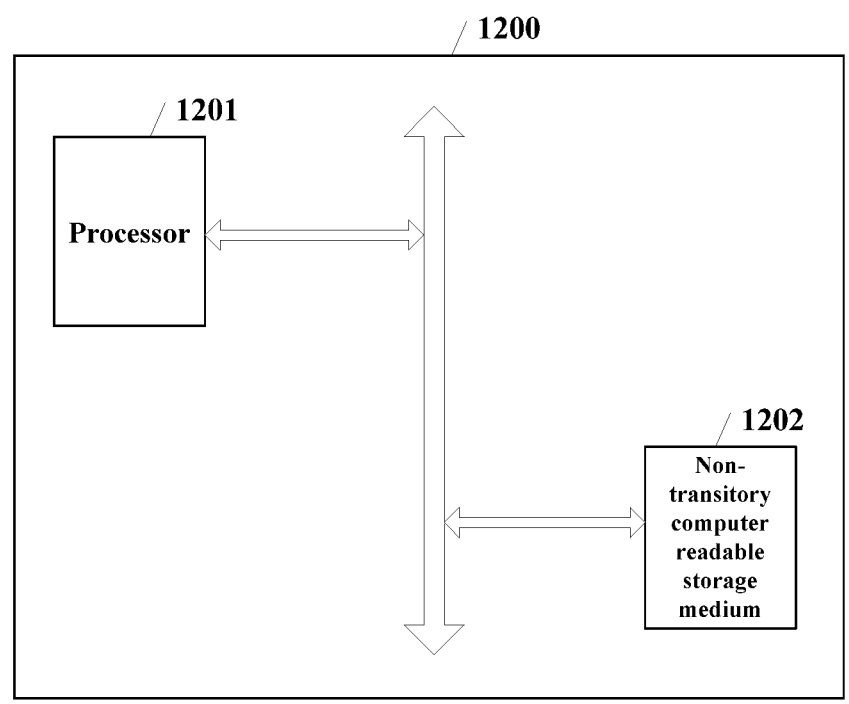
FIG. 14 is a schematic diagram of the physical apparatus structure of an authorization verification apparatus applied in embodiment 2 of the present application.

Referring to FIG. 14, which is a schematic diagram of the architecture of an authorization verification apparatus applied in embodiment 2 of the present application, wherein the application is a combination of one or more of an algorithm model and a software; the apparatus 1200 is applied to the target device of the application, the apparatus includes: a processor 1201 and a non-transitory computer readable storage medium 1202 connected with the processor through a bus;

the non-transitory computer readable storage medium 1202 stores one or more computer programs executable by the processor 1201; the processor 1201 implements the following steps when executing one or more computer programs:

receiving a software package of the application imported by an authorization platform after the authorization verification for the target device is passed according to license key information corresponding to the application;

performing secondary authorization verification on the target device according to the software package of the application, and determining whether to allow the target device to run the software package of the application based on a result of the secondary authorization verification.

Optionally, the processor 1201 can also be configured for receiving license key information imported by the authorization platform after generating the license key information corresponding to the application according to the description information and the information of the admission device of the application when the target device is the admission device of the application; the license key information includes authorization verification information; the authorization verification information is the first information generated based on data and description information of the application;

the processor 1201 can specifically be configured for determining whether the license key information has been imported into the target device when the software package of the application is run for the first time; if the license key information has been imported, unpacking the software package of the application to obtain data and description information of the application; generating first information based on the data and description information of the application, comparing the first information with the authorization verification information in the license key information; if the first information is the same as the authorization verification information in the license key information, determining that the secondary authorization verification for the target device is passed; otherwise, determining that the secondary authorization verification for the target device is not passed; if the license key information is not imported, determining that the secondary authorization verification for the target device is not passed.

Optionally, the processor 1201 can also be configured for receiving license key information imported by the authorization platform after generating the license key information corresponding to the application according to the description information and the information of the admission device of the application when the target device is the admission device of the application; the license key information includes authorization verification information, an effective time and authorization time limit; the authorization verification information is the first information generated based on data and description information of the application;

the processor 1201 can specifically be configured for calculating a first time difference between the current time and the effective time in the license key information when the software package of the application is run for the first time, and comparing the first time difference with the authorization time limit in the license key information; if the first time difference is not less than the authorization time limit, determining that the secondary authorization verification for the target device is not passed; if the first time difference is less than the authorization time limit, performing the following operations: determining whether the license key information has been imported into the target device; if the license key information has been imported, unpacking the software package of the application to obtain data and description information of the application; generating first information based on the data and description information of the application, comparing the first information with the authorization verification information in the license key information; if the first information is the same as the authorization verification information in the license key information, determining that the secondary authorization verification for the target device is passed; otherwise, determining that the secondary authorization verification for the target device is not passed; if the license key information is not imported, determining that the secondary authorization verification for the target device is not passed;

the processor 1201 can also be configured for calculating a second time difference between the current time and the effective time in the license key information when the software package of the application is run again, and comparing the second time difference with the authorization time limit in the license key information; if the second time difference is not less than the authorization time limit, prohibiting the target device from running the software package of the application again; if the second time difference is less than the authorization time limit, allowing the target device to run the software package of the application again.

Optionally, the processor 1201 can also be configured for receiving the license key information corresponding to the application imported by the authorization platform; the license key information includes authorization verification information; and the authorization authentication information is the first information generated based on the data and description information of the application;

the processor 1201 can specifically be configured for unpacking, when the software package of the application is run for the first time, the software package of the application to obtain data and description information of the application; generating first information based on the data and description information of the application, comparing the first information with the authorization verification information in the license key information; if the first information is the same as the authorization verification information in the license key information, determining that the secondary authorization verification for the target device is passed; otherwise, determining that the secondary authorization verification for the target device is not passed.

Optionally, the processor 1201 can also be configured for receiving the license key information corresponding to the application imported by the authorization platform; the license key information includes authorization verification information, an effective time and authorization time limit; and the authorization authentication information is the first information generated based on the data and description information of the application;

the processor 1201 can specifically be configured for calculating a first time difference between the current time and the effective time in the license key information when the software package of the application is run for the first time, and comparing the first time difference with the authorization time limit in the license key information; if the first time difference is not less than the authorization time limit, determining that the secondary authorization verification for the target device is not passed; if the first time difference is less than the authorization time limit, performing the following operations: unpacking the software package of the application to obtain data and description information of the application; generating first information based on the data and description information of the application, comparing the first information with the authorization verification information in the license key information; if the first information is the same as the authorization verification information in the license key information, determining that the secondary authorization verification for the target device is passed; otherwise, determining that the secondary authorization verification for the target device is not passed;

the processor 1201 can also be configured for calculating a second time difference between the current time and the effective time in the license key information when the software package of the application is run again, and comparing the second time difference with the authorization time limit in the license key information; if the second time difference is not less than the authorization time limit, prohibiting the target device from running the software package of the application again; if the second time difference is less than the authorization time limit, allowing the target device to run the software package of the application again.

The above-mentioned non-transitory computer readable storage medium may include RAM (Random Access Memory) or NVM (Non-Volatile Memory), such as at least one disk memory. Optionally, the non-transitory computer readable storage medium may also be at least one storage apparatus located away from the processor described above.

The above-mentioned processor can be a general-purpose processor, such as a central processing unit (CPU), a network processor (NP), or the like; it can also be a digital signal processor (DSP), an application specific integrated circuit (ASIC), a field-programmable gate array (FPGA) or other programmable logic device, a discrete gate or transistor logic device, a discrete hardware component.

The apparatus of FIGS. 11 and 12 are virtual apparatus, and the apparatus of FIGS. 13 and 14 are physical apparatus.

The embodiments of the present application provides a non-transitory computer readable storage medium, the non-transitory computer readable storage medium stores instructions which, when executed by a processor, cause the processor to implement steps in the authorization verification method for an application shown in FIG. 4, 5, 6, or 7.

The embodiments of the present application provides a non-transitory computer readable storage medium, the non-transitory computer readable storage medium stores instructions which, when executed by a processor, cause the processor to implement steps in the authorization verification method for an application shown in FIG. 8, 9, or 10.

The embodiments of the application also provides a computer program product, when executed, performs steps in the authorization verification method for an application shown in FIG. 4, FIG. 5, FIG. 6 or FIG. 7.

The embodiments of the application also provides a computer program product, when executed, performs the steps in the authorization verification method for an application shown in FIG. 8, FIG. 9 or FIG. 10.

In the aforementioned embodiments, it may be implemented in whole or in part by software, hardware, firmware, or any combination thereof. When implemented by software, it may be implemented in whole or in part in the form of a computer program product. The computer program product includes one or more computer instructions. The processes or functions described in accordance with the embodiments of the present invention is produced in whole or in part, when the computer program instructions are loaded and executed on a computer. The computer may be a general-purpose computer, a dedicated computer, a computer network, or other programmable device. The computer instructions may be stored in a computer-readable storage medium or may be transmitted from one computer-readable storage medium to another computer-readable storage medium, for example, the computer instructions may be transmitted from a web site, a computer, a server, or a data center to another web site, another computer, another server, or another data center via a cable (such as a coaxial cable, an optical fiber, a digital subscriber line (DSL)) or wireless (such as infrared, wireless, microwave, etc.). The computer-readable storage medium may be any available medium that may be accessed by a computer or a data storage device such as a server or a data center containing one or more available medium integrations. The available media may be magnetic media (such as floppy disks, hard disks, magnetic tapes), optical media (such as digital versatile disc (DVD)), or semiconductor media (such as solid state disk (SSD)).

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

The description is only for preferred embodiments of the present application, and embodiments are not so limited. Any modifications, substitutions, improvements, etc., which are made within the spirit and principles of the present application, will fall into the protection scope of the present application.

What is claimed is:

1. An authorization verification method for an application, wherein the application is a combination of one or more of an algorithm model and a software, the method is applicable for authorization verification of the algorithm model or the software; the method is executed by an authorization verification apparatus applied in an authorization platform, the authorization verification apparatus comprises a processor and a non-transitory computer readable storage medium having stored thereon a computer program, which, when executed by the processor, causes the processor to carry out operations of:

receiving an application generation instruction sent by a client; instructing an application generation server to generate data and description information of the application based on the application generation instruction; and packaging the data and the description information of the application into a software package, and storing the software package of the application in an application warehouse;

obtaining description information and information of an admission device of the application, wherein when it is determined that an application provider allows a device to use the application, the device is referred to as the admission device of the application; wherein obtaining information of the admission device of the application comprises: receiving an admission device submission instruction for the application sent by the client; and storing device information carried in the admission device submission instruction as the information of the admission device; wherein the device information carried in the admission device submission instruction is obtained from an admission device input instruction after the client receives the admission device input instruction for the application or is obtained from a service subsystem based on an admission device import instruction after the client receives the admission device import instruction for the application;

generating license key information corresponding to the application according to the description information and the information of the admission device, the license key information comprises: an application identifier, an admission device identifier and authorization verification information; wherein the generating license key information corresponding to the application according to the description information and the information of the admission device comprises: sending a license generation instruction carrying the description information and the information of the admission device to an authorization server, so that the authorization server generates, after receiving the license generation instruction, the license key information corresponding to the application according to the description information and the information of the admission device carried in the license generation instruction, and returns the generated license key information to the authorization platform; receiving the license key information returned by the authorization server; wherein the authorization server generating the license key information corresponding to the application according to the description information and the information of the admission device carried in the license generation instruction, comprises: taking an application identifier in the description information and a device identifier of the admission device as the application identifier and the admission device identifier in the license key information respectively; encrypting the data and description information of the application, and taking an encryption result as the authorization verification information in the license key information;

obtaining information of a target device of the application, wherein when it is not determined whether the application provider allows a device to use the application, the device is referred to as the target device of the application; wherein the obtaining information of the target device of the application comprises: receiving a target device submission instruction for the application sent by the client; and storing device information carried in the target device submission instruction as the information of the target device; wherein the device information carried in the target device submission instruction is obtained from a target device input instruction after the client receives the target device input instruction for the application;

performing authorization verification on the target device according to the license key information in an online manner;

prohibiting, if the authorization verification for the target device is not passed, the software package of the application from being imported into the target device;

importing, if the authorization verification for the target device is passed, the software package of the application into the target device, so that the target device performs secondary authorization verification for the target device according to the software package of the application in an offline manner, and determines whether to allow the target device to run the software package of the application based on a result of the secondary authorization verification; and wherein the target device performing secondary authorization verification for the target device according to the software package of the application in the offline manner comprises:

determining whether the license key information has been imported into the target device when the software package of the application is run for the first time;

unpacking, if the license key information has been imported, the software package of the application to obtain the data and description information of the application; encrypting the data and description information of the application to generate first information, comparing the first information with the authorization verification information in the license key information; if the first information is the same as the authorization verification information in the license key information, determining that the secondary authorization verification for the target device is passed, the target device is allowed to run the software package of the application;

if the first information is not the same with the authorization verification information in the license key information, determining that the secondary authorization verification for the target device is not passed, the target device is not allowed to run the software package of the application;

if the license key information is not imported, determining that the secondary authorization verification for the target device is not passed.

2. The method of claim 1, wherein the description information further comprises an authorization mark;

wherein performing authorization verification on the target device according to the license key information, comprises:

if a value of the authorization mark is an allowable authorization mark value, the application identifier in the description information is the same as the application identifier in the license key information, and the device identifier of the target device is one device identifier in the license key information, determining that the authorization verification for the target device is passed; otherwise, determining that the authorization verification for the target device is not passed.

3. The method of claim 1, wherein the description information further comprises an authorization mark; the license key information further comprises: an effective time and authorization time limit;

after generating license key information corresponding to the application according to the description information and the information of the admission device carried in the license generation instruction, the authorization server further performs:

setting the effective time in the license key information as current time;

setting the authorization time limit in the license key information as a preset time limit;

wherein performing authorization verification on the target device by the authorization platform according to the license key information, comprises:

calculating a time difference between the current time and the effective time in the license key information, and comparing the time difference with the authorization time limit in the license key information;

when the time difference is not less than the authorization time limit, determining that the authorization verification for the target device is not passed;

when the time difference is less than the authorization time limit, if a value of the authorization mark is an allowable authorization mark value, the application identifier in the description information is the same as the application identifier in the license key information, and the device identifier of the target device is one device identifier in the license key information, determining that the authorization verification for the target device is passed;

otherwise, determining that the authorization verification for the target device is not passed.

4. The method of claim 1, wherein the license key information further comprises: an effective time and authorization time limit;

after generating license key information corresponding to the application according to the description information and the information of the admission device carried in the license generation instruction, the authorization server further performs:

setting the effective time in the license key information as current time;

setting the authorization time limit in the license key information as a preset time limit;
the method further comprises:
the authorization platform importing the license key information into the admission device;
wherein the target device performing secondary authorization verification on the target device according to the software package of the application, comprises:
calculating a first time difference between the current time and the effective time in the license key information when the software package of the application is run for the first time, and comparing the first time difference with the authorization time limit in the license key information;
if the first time difference is not less than the authorization time limit, determining that the secondary authorization verification for the target device is not passed;
if the first time difference is less than the authorization time limit, performing following operations:
determining whether the license key information has been imported into the target device;
unpacking, if the license key information has been imported, the software package of the application to obtain the data and description information of the application; generating first information based on the data and description information of the application, comparing the first information with the authorization verification information in the license key information; if the first information is the same as the authorization verification information in the license key information, determining that the secondary authorization verification for the target device is passed; if the first information is not the same with the authorization verification information in the license key information, determining that the secondary authorization verification for the target device is not passed;
if the license key information is not imported, determining that the secondary authorization verification for the target device is not passed;
calculating a second time difference between the current time and the effective time in the license key information when the software package of the application is run again, and comparing the second time difference with the authorization time limit in the license key information;
if the second time difference is not less than the authorization time limit, prohibiting the target device from running the software package of the application again;
if the second time difference is less than the authorization time limit, allowing the target device to run the software package of the application again.

5. The method of claim 1, wherein the license key information further comprises: an effective time and authorization time limit;
after generating license key information corresponding to the application according to the description information and the information of the admission device carried in the license generation instruction, the authorization server further performs:
setting the effective time in the license key information as current time;
setting the authorization time limit in the license key information as a preset time limit;
the method further comprises:
the authorization platform importing the license key information into the target device;
the target device performing secondary authorization verification for the target device according to the software package of the application comprises:
calculating a first time difference between the current time and the effective time in the license key information when the software package of the application is run for the first time, and comparing the first time difference with the authorization time limit in the license key information;
if the first time difference is not less than the authorization time limit, determining that the secondary authorization verification for the target device is not passed;
if the first time difference is less than the authorization time limit, performing following operations:
unpacking the software package of the application to obtain the data and description information of the application; generating first information based on the data and description information of the application, comparing the first information with the authorization verification information in the license key information; if the first information is the same as the authorization verification information in the license key information, determining that the secondary authorization verification for the target device is passed; if the first information is not the same with the authorization verification information in the license key information, determining that the secondary authorization verification for the target device is not passed;
calculating a second time difference between the current time and the effective time in the license key information when the software package of the application is run again, and comparing the second time difference with the authorization time limit in the license key information;
if the second time difference is not less than the authorization time limit, prohibiting the target device from running the software package of the application again;
if the second time difference is less than the authorization time limit, allowing the target device to run the software package of the application again.

6. An authorization verification apparatus for an application, wherein the application is a combination of one or more of an algorithm model and a software; the apparatus is applied in an authorization platform and comprises: a processor, and a non-transitory computer readable storage medium connected with the processor through a bus;
one or more computer programs is stored in the non-transitory computer readable storage medium, which, when executed by the processor, the processor implements the following steps:
receiving an application generation instruction sent by a client; instructing an application generation server to generate data and description information of the application based on the application generation instruction; and packaging the data and the description information of the application into a software package, and storing the software package of the application in an application warehouse;
obtaining description information and information of an admission device of an application, wherein when it is determined that an application provider allows a device to use the application, the device is referred to as the admission device of the application; wherein obtaining information of the admission device of the application comprises: receiving an admission device submission instruction for the application sent by the client; and storing device information carried in the admission device submission instruction as the information of the admission device; wherein the device information carried in the admission device submission instruction is obtained from an admission device input instruction after the client receives the admission device input instruction for the application or is obtained from a service subsystem based on an admission device import instruction after the client receives the admission device import instruction for the application;

generating license key information corresponding to the application according to the description information and the information of the admission device, the license key information comprises: an application identifier, an admission device identifier and authorization verification information; wherein generating license key information corresponding to the application according to the description information and the information of the admission device comprises: sending a license generation instruction carrying the description information and the information of the admission device to an authorization server, so that the authorization server generates, after receiving the license generation instruction, the license key information corresponding to the application according to the description information and the information of the admission device carried in the license generation instruction, and returns the generated license key information to the authorization platform; receiving the license key information returned by the authorization server; wherein the authorization server generating the license key information corresponding to the application according to the description information and the information of the admission device carried in the license generation instruction, comprises: taking an application identifier in the description information and a device identifier of the admission device as the application identifier and the admission device identifier in the license key information respectively; encrypting the data and description information of the application, and taking an encryption result as the authorization verification information in the license key information;

obtaining information of a target device of the application, wherein when it is not determined whether the application provider allows a device to use the application, the device is referred to as the target device of the application; wherein the obtaining information of the target device of the application comprises: receiving a target device submission instruction for the application sent by the client; and storing device information carried in the target device submission instruction as the information of the target device; wherein the device information carried in the target device submission instruction is obtained from a target device input instruction after the client receives the target device input instruction for the application;

performing authorization verification on the target device according to the license key information in an online manner;

prohibiting the software package of the application from being imported into the target device if the authorization verification for the target device is not passed;

importing, if the authorization verification for the target device is passed, the software package of the application into the target device, so that the target device performs secondary authorization verification for the target device according to the software package of the application in an offline manner, and determining whether to allow the target device to run the software package of the application based on a result of the secondary authorization verification; and wherein the target device performing secondary authorization verification for the target device according to the software package of the application in the offline manner comprises:

determining whether the license key information has been imported into the target device when the software package of the application is run for the first time;

unpacking, if the license key information has been imported, the software package of the application to obtain the data and description information of the application; encrypting the data and description information of the application to generate first information, comparing the first information with the authorization verification information in the license key information; if the first information is the same as the authorization verification information in the license key information, determining that the secondary authorization verification for the target device is passed, the target device is allowed to run the software package of the application;

if the first information is not the same with the authorization verification information in the license key information, determining that the secondary authorization verification for the target device is not passed, the target device is not allowed to run the software package of the application;

if the license key information is not imported, determining that the secondary authorization verification for the target device is not passed.

7. An authorization verification method for an application, wherein the application is a combination of one or more of an algorithm model and a software, the method is applicable for authorization verification of the algorithm model or the software;

wherein the method is executed by an authorization verification apparatus applied in a target device of the application, the authorization verification apparatus comprises a processor and a non-transitory computer readable storage medium having stored thereon a computer program, which, when executed by the processor, causes the processor to carry out operations of:

receiving a software package of the application imported by an authorization platform after authorization verification for the target device in an online manner is passed according to license key information corresponding to the application, wherein when it is not determined whether an application provider allows a device to use the application, the device is referred to as the target device of the application; wherein the software package of the application imported by the authorization platform is obtained by packaging data and description information of the application generated by an application generation server based on an application generation instruction sent by a client; and performing secondary authorization verification on the target device according to the software package of the application in an offline manner, and determining whether to allow the target device to run the software package of the application based on a result of the secondary authorization verification;

wherein the method further comprises:

receiving license key information imported by the authorization platform after generating the license key information corresponding to the application according to description information and information of an admission device of the application when the target device is the admission device of the application; wherein the information of the admission device is obtained by performing, by the authorization platform, operations of: receiving an admission device submission instruction for the application sent by the client; and storing device information carried in the admission device submission instruction as the information of the admission device; wherein the device information carried in the admission device submission instruction is obtained from an admission device input instruction after the client receives the admission device input instruction for the application or is obtained from a service subsystem based on an admission device import instruction after the client receives the admission device import instruction for the application;

wherein the license key information comprises: an application identifier, an admission device identifier and authorization verification information, the license key information imported by the authorization platform is generated by operations of: sending, by the authorization platform, a license generation instruction carrying the description information and the information of the admission device to an authorization server, so that the authorization server generates, after receiving the license generation instruction, the license key information corresponding to the application according to the description information and the information of the admission device carried in the license generation instruction, and returns the generated license key information to the authorization platform; receiving, by the authorization platform, the license key information returned by the authorization server; wherein the authorization server generating the license key information corresponding to the application according to the description information and the information of the admission device carried in the license generation instruction, comprises: taking an application identifier in the description information and a device identifier of the admission device as the application identifier and the admission device identifier in the license key information respectively; encrypting the data and description information of the application, and taking an encryption result as the authorization verification information in the license key information, wherein when it is determined that the application provider allows a device to use the application, the device is referred to as the admission device of the application;

wherein, performing secondary authorization verification on the target device according to the software package of the application in an offline manner, comprises:

determining whether the license key information has been imported into the target device when the software package of the application is run for the first time;

unpacking, if the license key information has been imported, the software package of the application to obtain the data and description information of the application; encrypting the data and description information of the application to generate first information, comparing the first information with the authorization verification information in the license key information;

if the first information is the same as the authorization verification information in the license key information, determining that the secondary authorization verification for the target device is passed, the target device is allowed to run the software package of the application;

if the first information is not the same with the authorization verification information in the license key information, determining that the secondary authorization verification for the target device is not passed, the target device is not allowed to run the software package of the application;

if the license key information is not imported, determining that the secondary authorization verification for the target device is not passed.

8. The method of claim 7, further comprising:

the license key information further comprises an effective time and authorization time limit;

wherein performing secondary authorization verification on the target device according to the software package of the application, comprises:

calculating a first time difference between the current time and the effective time in the license key information when the software package of the application is run for the first time, and comparing the first time difference with the authorization time limit in the license key information;

if the first time difference is not less than the authorization time limit, determining that the secondary authorization verification for the target device is not passed;

if the first time difference is less than the authorization time limit, performing following operations:

determining whether the license key information has been imported into the target device;

unpacking, if the license key information has been imported, the software package of the application to obtain the data and description information of the application; generating first information based on the data and description information of the application, comparing the first information with the authorization verification information in the license key information;

if the first information is the same as the authorization verification information in the license key information, determining that the secondary authorization verification for the target device is passed; if the first information is not the same with the authorization verification information in the license key information, determining that the secondary authorization verification for the target device is not passed;

if the license key information is not imported, determining that the secondary authorization verification for the target device is not passed;

after performing secondary authorization verification on the target device according to the software package of the application, the method further comprises:

calculating a second time difference between the current time and the effective time in the license key information when the software package of the application is run again, and comparing the second time difference with the authorization time limit in the license key information;

if the second time difference is not less than the authorization time limit, prohibiting the target device from running the software package of the application again;

if the second time difference is less than the authorization time limit, allowing the target device to run the software package of the application again.

9. The method of claim 7, further comprising:

the license key information further comprises an effective time and authorization time limit;

wherein performing secondary authorization verification on the target device according to the software package of the application, comprises:

calculating a first time difference between the current time and the effective time in the license key information when the software package of the application is run for the first time, and comparing the first time difference with the authorization time limit in the license key information;

if the first time difference is not less than the authorization time limit, determining that the secondary authorization verification for the target device is not passed;

if the first time difference is less than the authorization time limit, performing following operations:

unpacking the software package of the application to obtain the data and description information of the application; generating first information based on the data and description information of the application, comparing the first information with the authorization verification information in the license key information; if the first information is the same as the authorization verification information in the license key information, determining that the secondary authorization verification for the target device is passed; if the first information is not the same with the authorization verification information in the license key information, determining that the secondary authorization verification for the target device is not passed, after performing secondary authorization verification on the target device according to the software package of the application, the method further comprises:

calculating a second time difference between the current time and the effective time in the license key information when the software package of the application is run again, and comparing the second time difference with the authorization time limit in the license key information;

if the second time difference is not less than the authorization time limit, prohibiting the target device from running the software package of the application again;

if the second time difference is less than the authorization time limit, allowing the target device to run the software package of the application again.

10. A non-transitory computer readable storage medium, wherein instructions are stored in the non-transitory computer readable storage medium, which, when executed by a processor, cause the processor to implement steps in the authorization verification method for an application of claim 7.

11. An authorization verification apparatus for an application, wherein the application is a combination of one or more of an algorithm model and a software;

the apparatus is applied in a target device of the application and comprises: a processor, and a non-transitory computer readable storage medium connected with the processor through a bus;

one or more computer programs is stored in the non-transitory computer readable storage medium, which, when executed by the processor, the processor implements the following steps:

receiving a software package of the application imported by an authorization platform after the authorization verification for the target device in an online manner is passed according to license key information corresponding to the application, wherein when it is not determined whether an application provider allows a device to use the application, the device is referred to as the target device of the application; wherein the software package of the application imported by the authorization platform is obtained by packaging data and description information of the application generated by an application generation server based on an application generation instruction sent by a client; and performing secondary authorization verification on the target device according to the software package of the application in an offline manner, and determining whether to allow the target device to run the software package of the application based on a result of the secondary authorization verification;

wherein the processor is caused to implement operations of:

receiving license key information imported by the authorization platform after generating the license key information corresponding to the application according to description information and information of an admission device of the application when the target device is the admission device of the application; wherein the information of the admission device is obtained by performing, by the authorization platform, operations of: receiving an admission device submission instruction for the application sent by the client; and storing device information carried in the admission device submission instruction as the information of the admission device; wherein the device information carried in the admission device submission instruction is obtained from an admission device input instruction after the client receives the admission device input instruction for the application or is obtained from a service subsystem based on an admission device import instruction after the client receives the admission device import instruction for the application;

wherein the license key information comprises: an application identifier, an admission device identifier and authorization verification information, the license key information imported by the authorization platform is generated by operations of: sending, by the authorization platform, a license generation instruction carrying the description information and the information of the admission device to an authorization server, so that the authorization server generates, after receiving the license generation instruction, the license key information corresponding to the application according to the description information and the information of the admission device carried in the license generation instruction, and returns the generated license key information to the authorization platform; receiving, by the authorization platform, the license key information returned by the authorization server; wherein the authorization server generating the license key information corresponding to the application according to the description information and the information of the admission device carried in the license generation instruction, comprises: taking an application identifier in the description information and a device identifier of the admission device as the application identifier and the admission device identifier in the license key information respectively; encrypting the data and description information of the application, and taking an encryption result as the authorization verification information in the license key information wherein when it is determined that the application provider allows a device to use the application, the device is referred to as the admission device of the application;

wherein, performing secondary authorization verification on the target device according to the software package of the application in an offline manner, comprises:

determining whether the license key information has been imported into the target device when the software package of the application is run for the first time;

unpacking, if the license key information has been imported, the software package of the application to obtain the data and description information of the application; encrypting the data and description information of the application to generate first information, comparing the first information with the authorization verification information in the license key information; if the first information is the same as the authorization verification information in the license key information, determining that the secondary authorization verification for the target device is passed, the target device is allowed to run the software package of the application; if the first information is not the same with the authorization verification information in the license key information, determining that the secondary authorization verification for the target device is not passed, the target device is not allowed to run the software package of the application;

if the license key information is not imported, determining that the secondary authorization verification for the target device is not passed.

12. A non-transitory computer readable storage medium, wherein instructions are stored in the non-transitory computer readable storage medium, which, when executed by a processor, cause the processor to implement steps in the authorization verification method for an application of claim 1.

* * * * *